US011615334B2

(12) United States Patent
Roetteler et al.

(10) Patent No.: US 11,615,334 B2
(45) Date of Patent: Mar. 28, 2023

(54) PEBBLING STRATEGIES FOR QUANTUM MEMORY MANAGEMENT

(71) Applicant: Microsoft Technology Licensing, LLC, Redmond, WA (US)

(72) Inventors: Martin Roetteler, Woodinville, WA (US); Giulia Meuli, Lausanne (CH)

(73) Assignee: Microsoft Technology Licensing, LLC, Redmond, WA (US)

(*) Notice: Subject to any disclaimer, the term of this patent is extended or adjusted under 35 U.S.C. 154(b) by 943 days.

(21) Appl. No.: 16/457,408

(22) Filed: Jun. 28, 2019

(65) Prior Publication Data
US 2020/0202250 A1 Jun. 25, 2020

Related U.S. Application Data

(60) Provisional application No. 62/782,256, filed on Dec. 19, 2018.

(51) Int. Cl.
*G06F 8/00* (2018.01)
*G06N 10/00* (2022.01)
*G06N 5/00* (2023.01)
*G06N 10/60* (2022.01)

(52) U.S. Cl.
CPC ............. *G06N 10/00* (2019.01); *G06N 5/003* (2013.01); *G06N 10/60* (2022.01)

(58) Field of Classification Search
CPC ........ G06N 10/00; G06N 5/003; G06N 10/60; G06F 3/0604; G06F 3/0631; G06F 3/0673
See application file for complete search history.

(56) References Cited

U.S. PATENT DOCUMENTS

| | | | | |
|---|---|---|---|---|
| 11,074,104 | B2* | 7/2021 | Gambetta | G06F 9/5044 |
| 11,080,266 | B2* | 8/2021 | Fan | G06F 16/2365 |
| 11,194,573 | B1* | 12/2021 | Smith | G06F 9/3804 |
| 11,194,946 | B2* | 12/2021 | Javadiabhari | G06F 30/39 |
| 2020/0184031 | A1* | 6/2020 | Horii | G06N 10/00 |
| 2020/0202250 | A1* | 6/2020 | Roetteler | G06N 10/60 |
| 2022/0188681 | A1* | 6/2022 | Bello | G06F 8/49 |

(Continued)

FOREIGN PATENT DOCUMENTS

| | | | | |
|---|---|---|---|---|
| EP | 3304363 A1 | 4/2018 | | |
| JP | 2003022261 A | * 1/2003 | ......... | G06F 17/504 |
| WO | 2016200747 A1 | 12/2016 | | |

OTHER PUBLICATIONS

Debjyoti, Reversible Pebble Games For Reducing Qubits in Hierarchical Quantum Circuit Synthesis, 2019, IEEE, pp. 102-107. (Year : 2019).*

(Continued)

*Primary Examiner* — Cheng Yuan Tseng
(74) *Attorney, Agent, or Firm* — Alleman Hall Creasman & Tuttle LLP

(57) ABSTRACT

Quantum memory management is becoming a pressing problem, especially given the recent research effort to develop new and more complex quantum algorithms. The disclosed technology concerns various example memory management schemes for quantum computing. For example, certain embodiments concern methods for managing quantum memory based on reversible pebbling games constructed from SAT-encodings.

20 Claims, 19 Drawing Sheets

(56) References Cited

U.S. PATENT DOCUMENTS

2022/0358390 A1* 11/2022 Ruedinger ............... G06F 8/41

OTHER PUBLICATIONS

Giulia, Reversible Pebbling Fame for Quantum Memory Management, IEEE, 2019, pp. 288-291.*

"The EPFL Combinational Benchmark Suite", Retrieved From: https://lsi.epfl.ch/benchmarks. Retrieved Date: Nov. 28, 2018, 7 Pages.

Amy, et al., "Verified Compilation of Space-Efficient Reversible Circuits", In repository of arXiv:1603.01635, Mar. 4, 2016, 24 Pages.

Bennett, Charles H., "Time/Space Trade-Offs for Reversible Computation", In SIAM Journal on Computing, vol. 18, Issue 4, Aug. 1989, pp. 766-776.

Bos, et al., "Fast Cryptography In Genus 2", In Proceedings of the 32nd Annual International Conference on the Theory and Applications of Cryptographic Techniques, May 26, 2013, pp. 194-210.

Chan, et al., "Hardness of Approximation in PSPACE and Separation Results for Pebble Games", In Proceedings of the IEEE 56th Annual Symposium on Foundations of Computer Science, Oct. 17, 2015, 20 Pages.

Knill, E, "An Analysis of Bennett's Pebble Game", In repository of arXiv:math/9508218, Aug. 8, 1995, 15 Pages.

Komarath, et al., "Pebbling Meets Coloring: Reversible Pebble Game On Trees", In Journal of Computer and System Sciences, vol. 91, Feb. 2018, 15 Pages.

Meuli, et al., "Reversible Pebbling Game for Quantum Memory Management", In Proceedings of Design Automation and Test in Europe Conference & Exhibition, Mar. 25, 2019, 6 Pages.

Parent, et al., "Reversible Circuit Compilation With Space Constraints", In repository of arXiv:1510.00377, Oct. 1, 2015, 32 Pages.

"International Search Report and Written Opinion Issued in PCT Application No. PCT/US19/064809", dated Apr. 14, 2020, 21 Pages.

Roetteler, et al., "Quantum Resource Estimates for Computing Elliptic Curve Discrete Logarithms", In repository of arXiv:1706.06752, Oct. 31, 2017, 24 Pages.

Soeken, et al., "Hierarchical Reversible Logic Synthesis Using LUTs", In Proceedings of the 54th Annual Design Automation Conference, Jun. 18, 2017, 6 Pages.

Soeken, et al., "Logic Synthesis for Quantum Computing", In repository of arXiv:1706.02721, Jun. 8, 2017, 15 Pages.

Soeken, et al., "Practical Exact Synthesis", In Proceedings of Design, Automation & Test in Europe Conference & Exhibition, Mar. 19, 2018, pp. 309-314.

* cited by examiner implementing a straight-line program via a sequence of quantum operations while guaranteeing a given total bound on available quantum memory - 1610

PEBBLING STRATEGIES FOR QUANTUM MEMORY MANAGEMENT

CROSS-REFERENCE TO RELATED APPLICATIONS

This application claims the benefit of U.S. Provisional Application No. 62/782,256 entitled "REVERSIBLE PEBBLING GAME FOR QUANTUM MEMORY MANAGEMENT" filed on Dec. 19, 2018, which is hereby incorporated herein by reference in its entirety.

FIELD

This application concerns quantum computing. In particular, this application concerns quantum memory management in a quantum computing architecture.

SUMMARY

Quantum memory management is becoming a pressing problem, especially given the recent research efforts to develop new and more complex quantum algorithms. The disclosed technology concerns various example memory management schemes for quantum computing and facilitate the implementation of said complex quantum algorithms at scale.

In certain embodiments, a straight-line program is implemented via a sequence of quantum operations while guaranteeing a given total bound on available quantum memory. In particular embodiments, each step of the straight-line program corresponds to a quantum circuit from a set of library operations. For instance, the library operations can comprise in-place operations and out-of-place operations. In some embodiments, the method further comprises computing a dependency graph structure for the straight-line program. The dependency graph structure, together with the given total bound on available memory, can be used to encode an instance of a satisfiability (SAT) problem. Still further, in certain embodiments, the method further comprises using a SAT solver to attempt to solve the SAT problem. The SAT problem can be a solvable SAT problem, and the method can further comprise constructing a solution to the SAT problem where the solution corresponds to a reversible pebble game. In some embodiments, the method further comprises translating the reversible pebble game into a quantum circuit to compute the quantum algorithm. In certain embodiments, the method further comprises trading off a number of qubits relative to a size or depth of a quantum circuit to implement a function in the quantum circuit. The trading off can be performed by constructing one or more pebble games on a dependency graph. In particular embodiments, the method further comprises: constructing a SAT problem to determine the sequence of quantum operations; using a SAT solver to attempt to solve the SAT problem; receiving an indication that the SAT solver failed in an attempt; adjusting a number of available qubits; and repeating use of the SAT solver to attempt to solve the adjusted SAT problem. In certain embodiments, the method further comprises: constructing a SAT problem to determine the sequence of quantum operations; using a SAT solver to attempt to solve the SAT problem; receiving an indication that the SAT solver failed in an attempt; executing a bounded-model checking solver to generate mathematical evidence that no solution to the pebble game with a given number of steps and a given number of pebbles can be constructed, or executing PDR (Property Directed Reachability) to generate mathematical evidence that no solution to the pebble game with a given number of pebbles can be constructed.

In another embodiment, a satisfiability (SAT) problem is constructed to determine a sequence of quantum operations implementing a quantum circuit and to be executed by a defined number of available qubits in a quantum computing device. A SAT solver is used to attempt to solve the SAT problem. In some embodiments, the method further comprises receiving an indication that the SAT solver failed in an attempt; adjusting a number of available qubits; and repeating use of the SAT solver to attempt to solve the adjusted SAT problem. In certain embodiments, a solution to the SAT problem corresponds to a reversible pebble game. In particular embodiments, the method further comprises translating the solution to the SAT into an implementable description of the sequence of quantum operations.

Any of the disclosed embodiments can be implemented by one or more computer-readable media storing computer-executable instructions, which when executed by a computer cause the computer to perform any of the disclosed methods. Any of the disclosed embodiments can also be performed by systems for performing embodiments of the disclosed embodiments comprising a classical computer configured to program, control, and/or measure a quantum computing device in accordance with the disclosed technology.

BRIEF DESCRIPTION OF THE DRAWINGS

FIG. 1($a$) does not uncompute the first part, leading to an unknown garbage state, and FIG. 1($b$) does uncompute the first part by computing it again in reverse order.

FIG. 3($b$) is a schematic block diagram showing an uncomputing scheme according to a space-optimized reordering strategy. FIG. 3($c$) is a schematic block diagram showing an uncomputing scheme according to a space-optimized strategy by increasing the number of gates.

DETAILED DESCRIPTION

I. General Considerations

Figure 1A:
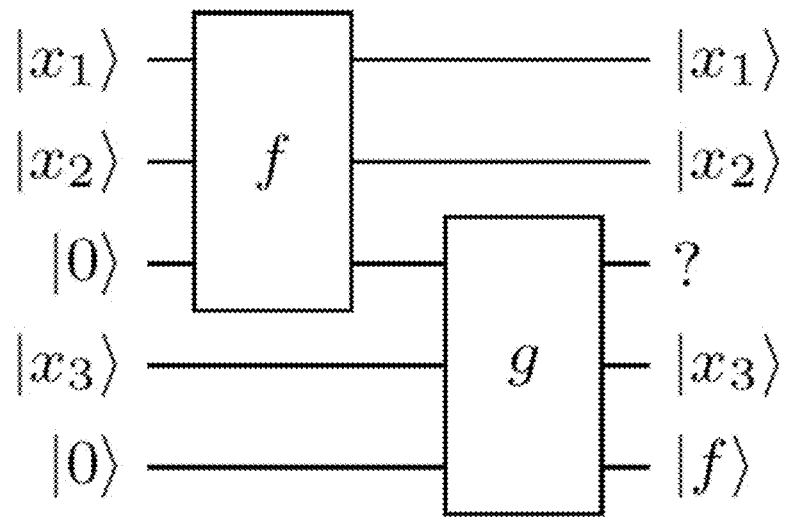
FIGS. 1($a$) and 1($b$) are schematic block diagrams illustrating examples of mapping two parts of a circuit description into a quantum circuit.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction, Background, and Overview

A. Introduction

Quantum memory management is becoming a pressing problem, especially given the recent research effort to develop new and more complex quantum algorithms. The only existing automatic method for quantum states clean-up relies on the availability of many extra resources. In this work, an automatic tool for quantum memory management is disclosed. It is shown how this problem matches the reversible pebbling game. Based on that, a SAT-based algorithm is disclosed that returns a valid clean-up strategy, taking the limitations of the quantum hardware into account. The disclosed tools empower the designer with the flexibility required to explore the trade-off between memory resources and number of operations. Three show-cases are disclosed to prove the validity of the approach. First, the algorithm is applied to straight-line programs, widely used in cryptographic applications. Second, a comparison is performed with the existing approach, showing an average improvement of 52.77. %. Finally, the advantage of using the tool is shown when synthesizing a quantum circuit on a constrained near-term quantum device.

B. Background

When composing library operations into larger functional units and programs, the issue of cleaning up intermediate qubits arises. This problem does not arise in classical compilers and is a unique consequence of the underlying data being quantum bits instead of classical bits. The quantumness of the data makes it difficult to get rid of allocated scratch qubits (so-called "ancillas") that are entangled with the rest of the computer, and/or difficult to manage precision and approximation errors in order to achieve an overall target. The disclosed technology includes a method to perform an analog of 'garbage collection' for quantum computations (e.g., it detects dependencies and cleans up unused scratch qubits and makes them available for future use). This example method realizes a space-time tradeoff technique between the total amount of quantum memory used and the total circuit depth and is based on reversible pebble games that are played on the dependency graph of the given program.

C. Overview

Example embodiments of the disclosed technology involve expressing a reversible pebbling game as a SAT formula that can then be solved (e.g., using a SAT solver). Finding an efficient pebbling strategy is desirable in quantum algorithm development, where often small manually optimized circuits are cascaded together to perform more complex computations. In particular, embodiments of the disclosed technology enable computations in a constrained system, which which would not otherwise be possible (e.g., using simple strategies, such as the so-called Bennett strategy.

Figure 14:
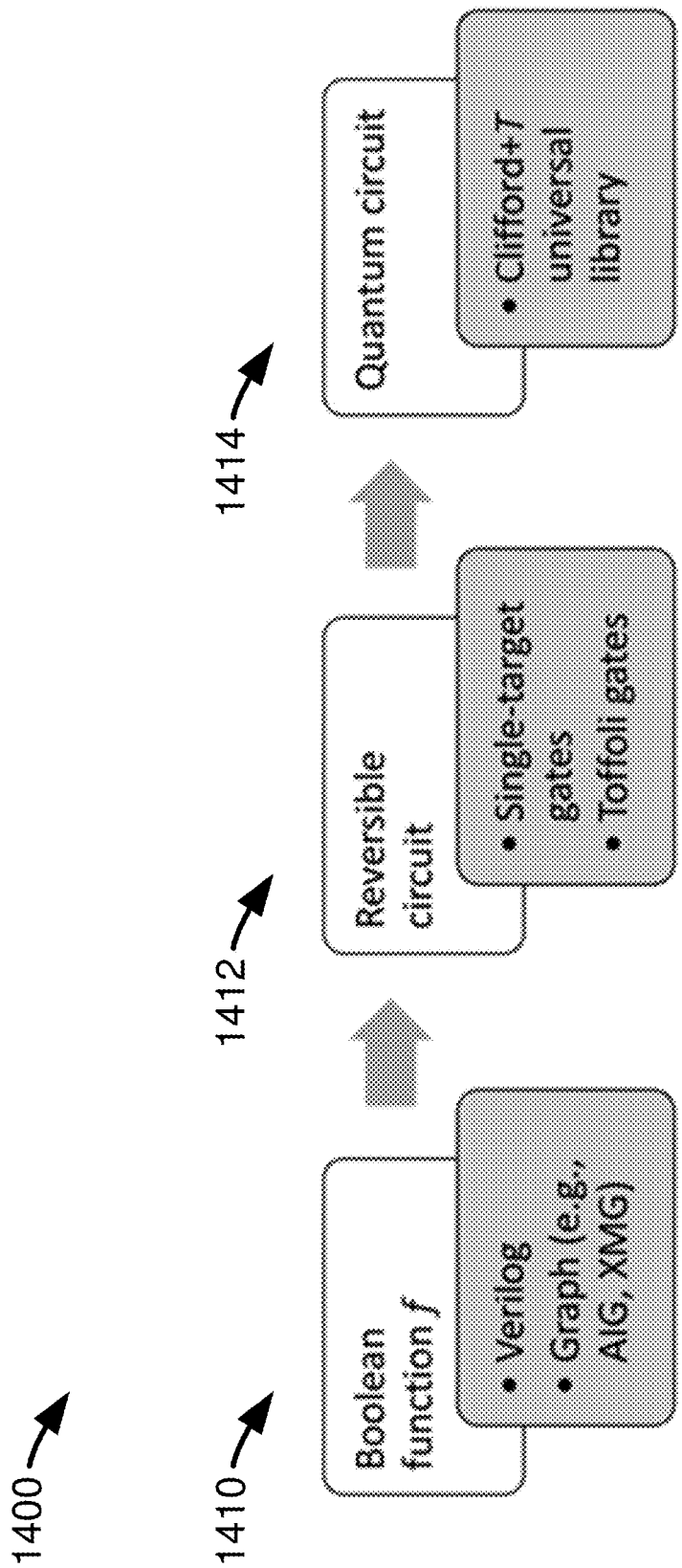
FIG. 14 is a schematic block diagram illustrating example stages of decomposing a Boolean function into quantum gates.

More generally, quantum circuit designers will face strict constraints imposed by the technology (e.g., the number of available qubits) as quantum computing technology develops. Quantum compiling aims at helping designers to meet technology constraints by automatically synthesizing complex logic designs into quantum circuits, minimizing the number of required resources. The problem of compiling a Boolean function into quantum gates is not trivial and can be decomposed into stages. These stages are illustrated, for example purposes, in FIG. 14. In particular. FIG. 14 is a schematic block diagram 1400 illustrating example stages of decomposing a Boolean function into quantum gates. At 1410 of FIG. 14, a boolean function is described in a higher-level language (such as a register-transfer-level description such as Verilog, VHDL, or the like, or by a graph representation such as AIG, XMG). At 1412, a reversible circuit representation is generated that is suitable for implementation in a physical quantum circuit. For example, the reversible circuit representation can include one or more single-target gates or Toffoli gates. At 1414, a quantum circuit is programmed to programmed/configured to perform the desired reversible circuit representation. In particular implementations, the quantum circuit can be configured using a universal library (such as a Clifford+T universal library). For each step there are different methods, according to the various function representations. For instance, hierarchical methods start from a multilevel logic network representation and uses ancillae to store intermediate results. This problem can be expressed as a problem of constructing a quantum circuit that computes a given algorithm (which can be as simple as a single function f, but could involve many such functions) under a given space constraint S that specifies the total number of available quantum memory (typically measured as the number of qubits).

One desirable goal is to express the quantum circuit using a universal gate set such as the Clifford+T universal quantum library which is composed of the Clifford gates, Hadamard and Controlled-NOT, and the non-Clifford T gate. It is known that any quantum algorithm can be described by a Clifford+T circuit. When a set of operations is performed on a quantum system, some qubits will hold the intermediate results of the computation, while others will hold the final results. A desirable property for quantum circuits is to be garbage free, meaning that all qubits holding intermediate results are reset to their initial state at the end of a computation. Otherwise, results that are entangled with qubits carrying intermediate values can be invalidated. Consequently, an effective memory management systems which guarantees erasure of intermediate results is desirable in quantum circuit synthesis. For this reason, quantum memory management is fundamentally different from classical garbage management. In fact garbage states, that are entangled with the rest of the system cannot be simply erased. Such procedure would require measurement and consequent destruction of the entanglement, hence they need to be "uncomputed", by performing their original computation in reverse.

In certain embodiments, the problem of finding a strategy to compute and uncompute intermediate states for a given number of qubits corresponds to solving the reversible pebbling game. In this disclosure, example methods that find good clean up strategies, and that do so automatically by solving the reversible pebbling game, are described.

Particular example embodiments can be described as follows: given a directed acyclic graph (DAG) and a number of pebbles, find a valid pebbling strategy in the minimum number of steps; decompose this problem into many SAT problems (e.g., where each problem asks if there exists a strategy that pebbles a given DAG using S pebbles in N steps); and execute a SAT for each decomposed SAT problem. The solver can either find a solution and return a pebbling strategy, or state that no solution exists. In the case of no solution, one can increase the number of steps to N+1 until a satisfying solution is found. This disclosure describes: how to encode those SAT problems, which tools to use to solve them, and/or how to construct the final quantum circuit from the solution of the pebbling game.

III. Example Embodiments

A. Introduction

A large part of the design of quantum algorithms is still performed manually, despite the emergence of several automatic methods for both synthesis and optimization of quantum circuits. Most manual and automatic approaches for quantum circuit synthesis decompose large functionality into smaller parts in order to deal with complexity. Each part requires some resources in terms of qubits and quantum operations. The components can be connected together in order to obtain the desired computation for the overall circuit.

Most of the parts of a large function are used to compute intermediate values, which are stored on qubits. However, the final composed circuit desirably does not emit any of those values. Otherwise, the computed results may entangle with intermediate values and compromise the overall quantum algorithm. Since quantum operations are reversible, intermediate results can be "uncomputed" by performing the same operations that computed them, in reverse order. FIG. 1 illustrates a small example. The composition of the two functions f and g generates an unknown state that can be uncomputed by performing f in reverse order.

There are many possible ways to combine the small parts of a decomposition, each of which resulting in different accumulated costs for number of qubits and number of quantum operations. The requirement that all intermediate results must be uncomputed makes finding a good way to combine parts particularly difficult in quantum computing. Consequently, effective memory management which guarantees erasure of intermediate results is desirable in quantum circuit synthesis.

Figure 1B:
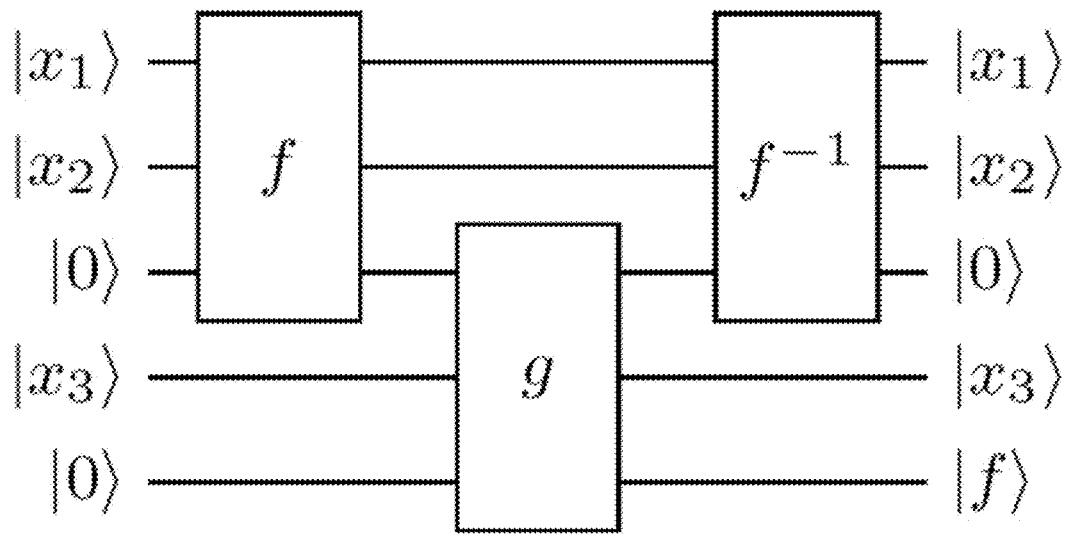

In particular, FIGS. 1(a) and 1(b) are schematic block diagrams 100, 102 illustrating examples of mapping two parts into quantum circuit. FIG. 1(a) does not uncompute the first part, leading to an unknown garbage state, and FIG. 1(b) does uncompute the first part by computing it again in reverse order.

The problem of finding a strategy to compute and uncompute intermediate states for a given fixed number of qubits corresponds to solving the reversible pebbling game. The reversible pebbling game problem has been studied for the first time by Bennett (see C. H. Bennett. "Time/space trade-offs for reversible computation," SIAM Journal on Computing, vol. 18, no. 4. pp. 766-7761989), in the context of exploring space/time trade-off in reversible computation. Input is a Directed Acyclic Graph (DAG), in which each node corresponds to one part of the decomposed computation, and edges connect nodes defining data dependency. Also, nodes can be pebbled, meaning that the computed value is available on some resource, in our case on a qubit. The game comprises placing pebbles on the graph nodes. Initially no node is pebbled. A pebble can be placed on a node if all its children are pebbled, and the same condition is required to remove a pebble from a node. The game is concluded if all the outputs are pebbled and all the other nodes are unpebbled. Solving the problem returns a valid clean-up strategy.

The problem complexity has been studied in S. M. Chan, M. Lauria. J. Nordstrom, and M. Vinyals. "Hardness of approximation in PSPACE and separation results for pebble games," in 2015 IEEE 56th Annual Symposium on Foundations of Computer Science (FOCS), vol. 00, 2015. pp. 466-485, where the authors prove that the problem is PSPACE-complete, as the non-reversible pebbling game. An explicit asymptotic expression for the best time-space product is given in E. Knill, "An analysis of Bennett's pebble game." arXiv preprint math/9508218, 1995, while the asymptotic behavior on trees is studied in B. Komarath. J. Sarma, and S. Sawlani, "Pebbling meets coloring: reversible pebble game on trees" Journal of Computer and System Sciences, vol. 91. pp. 33-41, 2018.

In certain embodiments of the disclosed technology, solutions to the reversible pebbling game are presented that cast the problem as a satisfiability problem. It is also shown how the method is capable of exploring the trade-off between space (number of qubits) and time (number of operations). In an experimental evaluation, several examples are showcased as to how embodiments of the disclosed technology can be used to find memory management strategies both for manual and automatic synthesis approaches.

B. Preliminaries

Quantum circuits are models of computation in which each gate describes an operation performed on an array of qubits. Given an n qubits system, any operation can be described by a $2^n \times 2^n$ unitary matrix. An example of a single qubit operator is the Hadamard gate $$H = \frac{1}{\sqrt{2}}\begin{pmatrix} 1 & 1 \\ 1 & -1 \end{pmatrix}$$

that creates superposition when applied on a qubit, i.e., $$H|0\rangle = \frac{1}{\sqrt{2}}(|0\rangle + |1\rangle).$$

There are different sets of quantum operations that have been proved to be universal, as they can approximate any unitary arbitrarily precise. Among those, a widely used one is the Clifford+T library. The disclosed approach abstracts from the actual quantum operations that are being performed, and therefore the background on quantum computation is kept brief, but a detailed background on quantum computing is provided in Nielsen, Michael A.; Chuang, Isaac L., "Quantum Computation and Quantum Information"

C. Quantum Memory Management

The problem of quantum memory management is important in quantum circuit design, as all the garbage states need to be carefully cleaned up.

Figure 2:
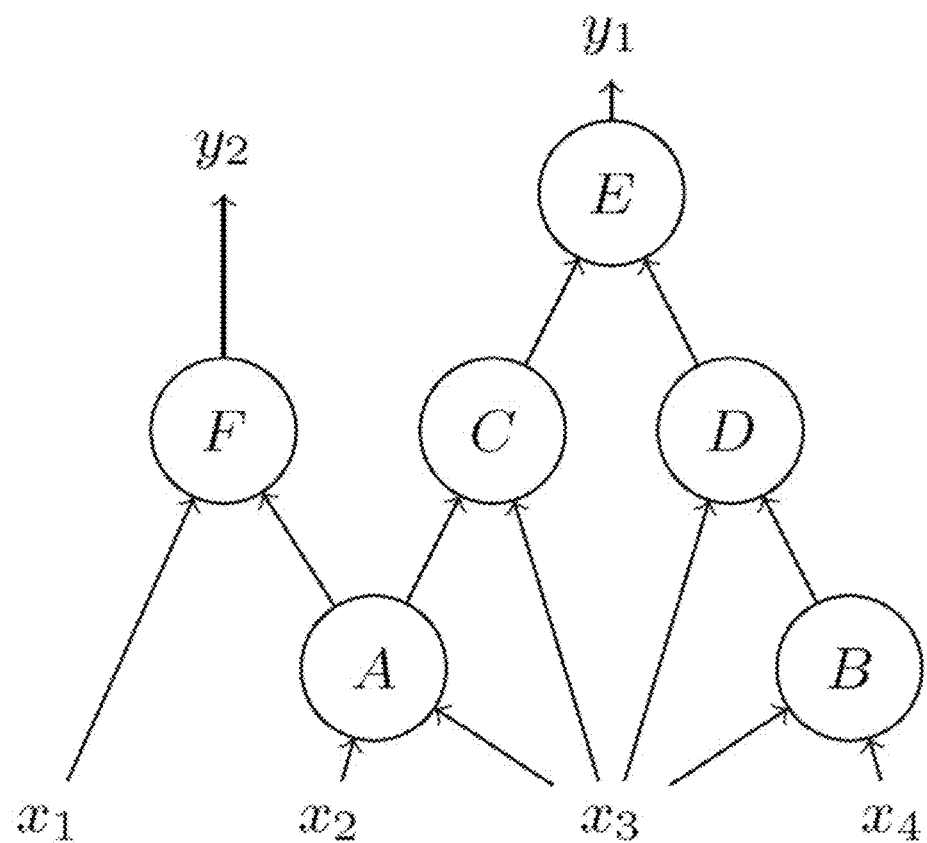
FIG. 2 is a schematic block diagram of an example directed acyclic graph (DAG) that defines data dependency between the parts of an algorithm description.
Figure 3A:
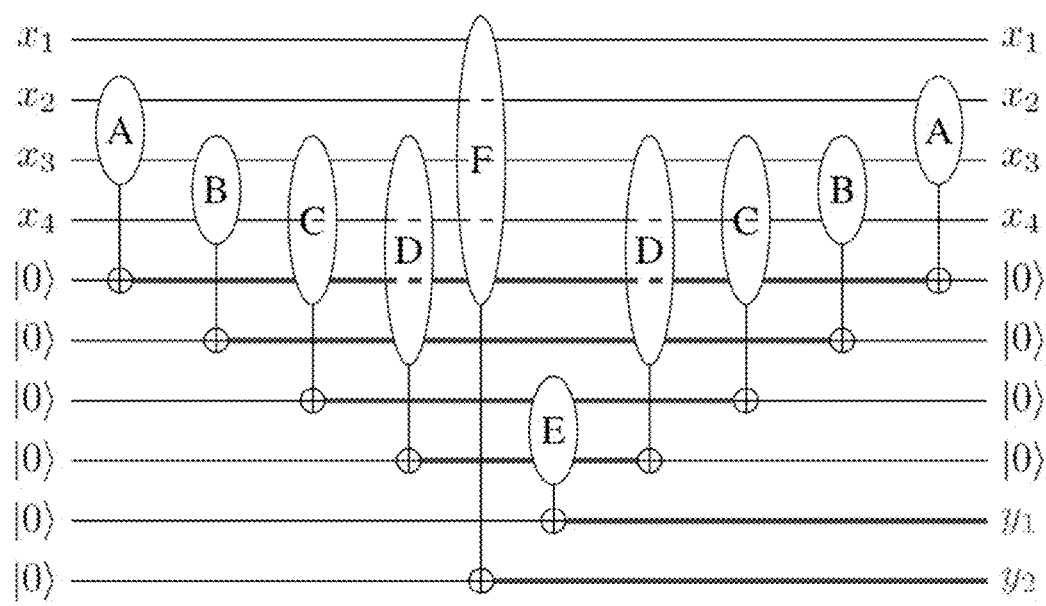
FIG. 3($a$) is a schematic block diagram of a reversible circuit showing an uncomputing strategy according to the Bennett strategy.
Figure 3B:
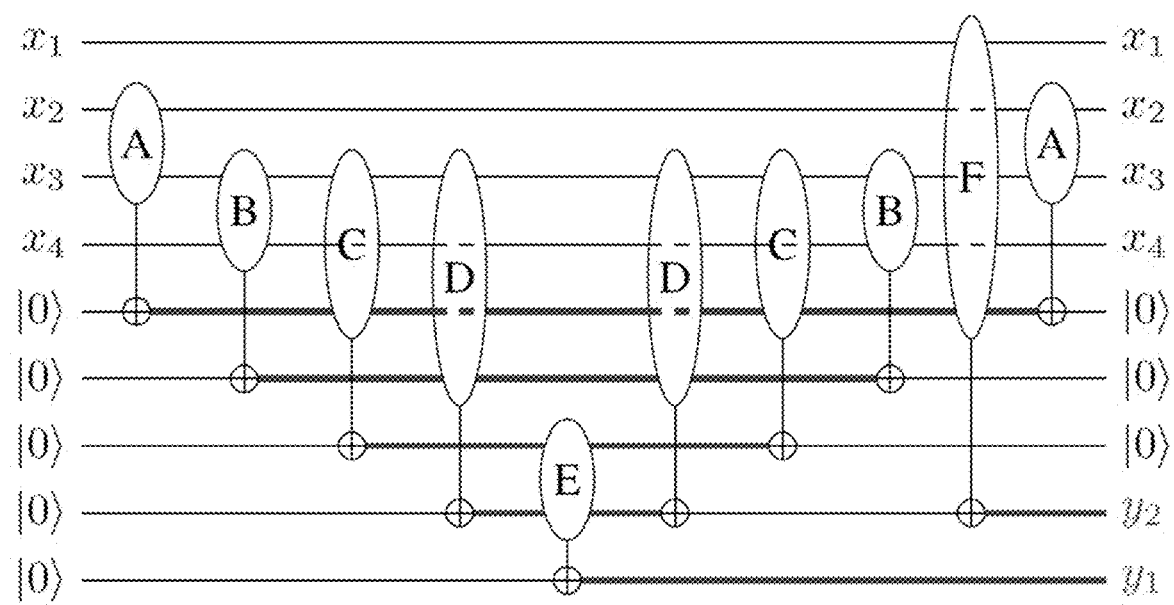
Figure 3C:
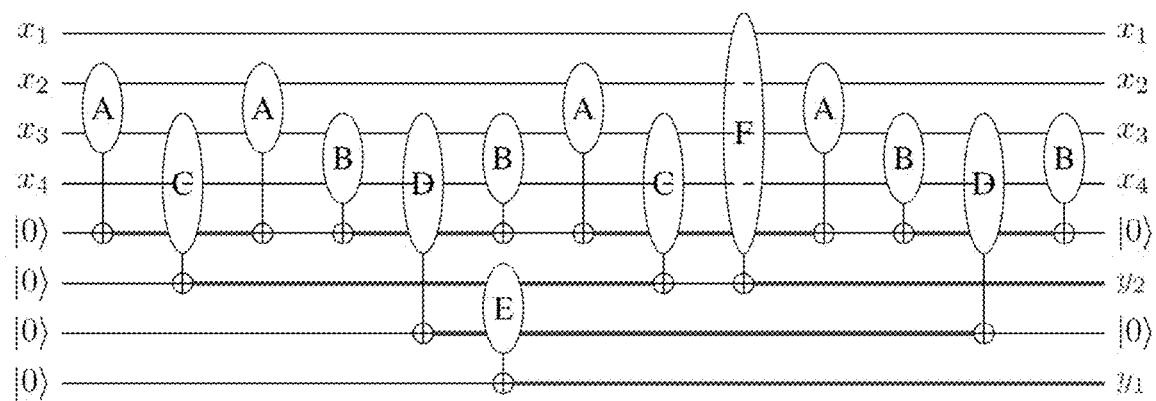

FIG. 2 is a schematic block diagram 200 of an example directed acyclic graph (DAG). FIG. 3(a) is a schematic block diagram 300 showing an uncomputing strategy according to the Bennett strategy. FIG. 3(b) is a schematic block diagram 302 showing an uncomputing scheme according to a space-optimized by reordering strategy. FIG. 3(c) is a schematic block diagram 304 showing an uncomputing scheme according to a space-optimized strategy by increasing the number of gates.

In the remainder of this section, an example of a quantum algorithm is disclosed that performs the following mapping: $|x_1\rangle |x_2\rangle |x_3\rangle |x_4\rangle |0\rangle |0\rangle \to |x_1\rangle |x_2\rangle |x_3\rangle |x_4\rangle |y_1\rangle |y_2\rangle$ where

| | | |
|---|---|---|
| $z_1 = A(x_2, x_3)$ | $z_2 = C(z_1, x_3)$ | $z_3 = B(x_3, x_4)$ |
| $z_4 = D(z_3, x_3)$ | $y_1 = E(z_2, z_4)$ | $y_2 = F(x_1, z_1)$ | with A, B, C, D, E, F being some generic 2-input Boolean operations and $z_1$, $z_2$, $z_3$, $z_4$ the intermediate results. Such computation can be represented using the DAG, for example, in FIG. 2, in which each node represents an operation. An edge is drawn from a node v to a node w, if w requires the value of v (see FIG. 2).

In order to build the quantum circuit to perform the computation, one can exploit the direct correspondence between each node in the graph and a reversible single-target gate.

Definition 1(Single-target gate): A single-target gate $G_c$ is a reversible gate characterized by a control function c, by a set of control qubits $q_1, \ldots, q_k$ and by a target qubit $q_t$. The gate inverts the value of the target line if $c(q_1, \ldots, q_k)$ evaluates to true, e.g., $\mapsto$ $G_c:|q_1\rangle \ldots |q_k\rangle |q_t\rangle \mapsto |q_1\rangle \ldots |q_k\rangle |q_t \oplus c(q_1, \ldots, q_k)\rangle$ The reversible circuit resulting from this translation is shown in FIGS. 3(a)-3(c) When two identical gates are performed twice on the same target, the value on the line is uncomputed, and comes back to its original state. Qubits initialized to $|0\rangle$, called ancillae, are used to store the intermediate results and are desirably restored after the computation. Once the results $y_1$ and $y_2$ have been computed, all the intermediate values $z_1$, $z_2$, $z_3$, $z_4$ are desirably cleaned up.

A simple and straightforward solution is the one illustrated by FIG. 3(a), which is referred to as the Bennett strategy. See, e.g., C. H. Bennett, "Time/space trade-offs for reversible computation," SIAM Journal on Computing, vol. 18, no. 4, pp. 766-776 (1989). This strategy involves computing all the operations in a bottom-up order, and then uncomputing the intermediate results in a top-down fashion, so that all the nodes have their inputs available. This strategy always leads to the minimum number of gates, and to the maximum number of qubits.

The order in which the DAG is converted into a reversible circuit can have a significant effect on how the memory is managed. In the example strategy in FIG. 3(b), it is shown how, only by changing the order of the operations, it is possible to save one qubit, without increasing the duration of the computation.

Finally, by allowing an increase in the number of gates, one can further reduce the number of ancillae to 4. In this case some functions are computed several times (see FIG. 3(c).)

In FIGS. 3(a)-(c), ancillae are colored red during the time they are storing an intermediate result. The first two strategies store values for a long time during which they are not needed, whereas the last strategy makes a good usage of fewer memory. Those three graphs are useful to visualize the trade-off between hardware resources (qubits) and time/complexity (number of operations).

It is difficult to state that the last method performs better than the first one, as that would depend from the actual hardware constraints. What this disclosure provides are embodiments that empower a designer with the ability to selectively choose exchange memory vs. time and vice versa.

D. Reversible Pebbling Game

The problem of finding a desirable uncomputing strategy is equivalent to the reversible pebbling game problem. In the remainder, one can use independently a pebbling and uncomputing strategy.

Definition 2 (Reversible pebbling configuration): A reversible pebbling configuration of a DAG G=(V, E) is the set P⊆V of all the pebbled vertices.

Definition 3 (Reversible pebbling strategy): A reversible pebbling strategy of a DAG G is a sequence of reversible pebbling configurations $P=(P_1, \ldots P_m)$ such that $P_1=\{\}$ and $P_m=O$, where O is the set of all sinks of G. For each $1 \le i \le m$, we have $P_i = P_{i-1} \cup \{v\}$ or $P_i = P_{i-1} \setminus \{v\}$ and $P_i \ne P_{i-1}$. All in-neighbors of v are in $P_{i-1}$.

Figure 4A:
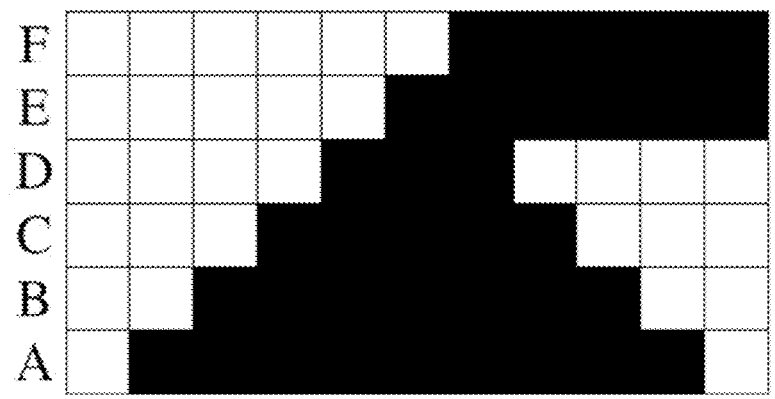
FIGS. 4($a$) and 4($b$) illustrates two possible pebbling strategies for the DAG from FIG. 2.
Figure 4B:
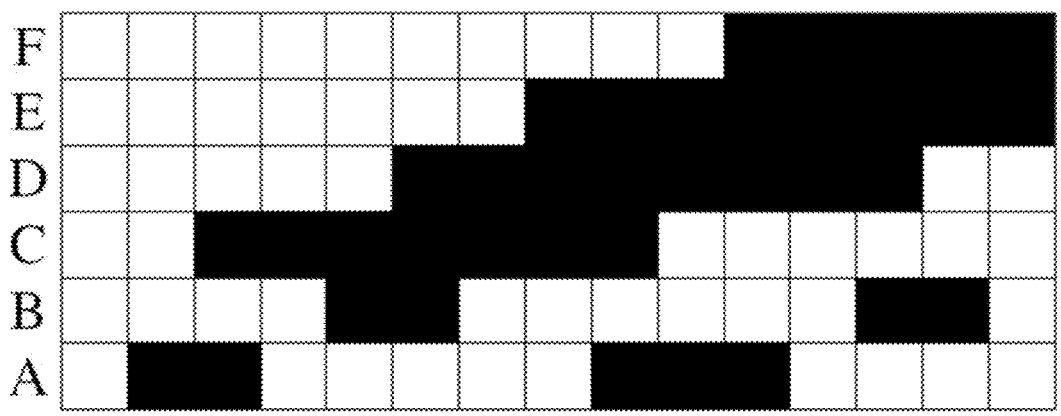

In FIGS. 4(a) and 4(b), two possible pebbling strategies for the DAG are shown. Each row of the grids represents a node and at each step corresponds one column from left to right. A black square means that the corresponding node is pebbled. In accordance to the rules of the game, the initial configuration is empty and the last only contains output vertices. In those examples, only one move per step is allowed. The first strategy is the one reported in C. II. Bennett, "Time/space trade-offs for reversible computation," SIAM Journal on Computing, vol. 18, no. 4, pp. 766-776, 1989, in which one naively computes all the nodes and then uncomputes intermediate results. This pebbling requires a number of pebbles equal to the number of nodes, 6 in the example, and only 10 steps, that is minimum. The complete sequence of pebbling configurations for the first example is:

| | |
|---|---|
| $P_0 = \{ \}$ | $P_6 = \{A, B, C, D, E, F\}$ |
| $P_1 = \{A\}$ | $P_7 = \{A, B, C, E, F\}$ |
| $P_2 = \{A, B\}$ | $P_8 = \{A, B, E, F\}$ |
| $P_3 = \{A, B, C\}$ | $P_9 = \{A, E, F\}$ |
| $P_4 = \{A, B, C, D\}$ | $P_{10} = \{E, F\}$ |
| $P_5 = \{A, B, C, D, E\}$ | |

The second approach is a strategy that only uses 4 pebbles. To reduce the number of pebbles, it computes twice the nodes a and b, increasing the number of steps to 14. The complete sequence of pebbling configurations for the first example is:

| | |
|---|---|
| $P_0 = \{ \}$ | $P_8 = \{A, C, D, E\}$ |
| $P_1 = \{A\}$ | $P_9 = \{A, D, E\}$ |
| $P_2 = \{A, C\}$ | $P_{10} = \{A, D, E, F\}$ |
| $P_3 = \{C\}$ | $P_{11} = \{D, E, F\}$ |
| $P_4 = \{B, C\}$ | $P_{12} = \{B, D, E, F\}$ |
| $P_5 = \{B, C, D\}$ | $P_{13} = \{B, E, F\}$ |
| $P_6 = \{C, D\}$ | $P_{14} = \{E, F\}$ |
| $P_7 = \{C, D, E\}$ | |

E. SAT Solver

Given a Boolean function $f(x_1, \ldots, x_n)$, the Boolean satisfiability problem (or SAT problem) comprises determining an assignment V to the variables $x_1, \ldots, x_n$ such that $f$ is satisfied (evaluates to true). If such an assignment exists, it will be called a satisfying assignment, otherwise the problem is unsatisfiable. SAT solvers are software programs in which $f$ is specified as conjunctive normal form (CNF) comprising of a conjunction of clauses where each clause is a disjunction of literals. Here, a literal is defined as an instance of a variable or its complement. SAT can be summarized as follows: given a list of clauses, determine if there exists a variable assignment that satisfies all of them.

F. SAT—Encoding

In this section, embodiments are disclosed for finding a good pebbling strategy while constraining the maximum number of pebbles per step.

Problem 1: Given a DAG and a number of pebbles, find a valid pebbling strategy using the minimum number of steps. As one uses a SAT solver to extract a solution, certain embodiments of the disclosed technology decompose the problem into many SAT problems.

Problem 2: Given a DAG and K pebbles, does a valid pebbling strategy with K steps exist?

The solver can either find a solution and return a pebbling strategy, or state that no solution exists. In this case, one can increase the number of steps to K+1 until a satisfying solution is found.

In this section, a description is provided as to how to encode those SAT problems. Following the definition of a reversible pebbling game given in Section II.D, one can first declare a set of variables, and then one can impose satisfiability constraints.

G. Variables

The input DAG G=(V, E) has some nodes which compute an output value and those will be referred to as a set $O \subseteq V$. Note that the primary inputs are not nodes in the DAG. Also defined is $C(v)=\{w|w \to v\}$ as all children of a node v.

Example 1

The DAG in FIG. 2 has six nodes {A, B, C, D, E, F} and two outputs O={E, F}. Note that, e.g., $C(A)=\emptyset$, since the primary inputs are not part of the DAG.

Problem 2 is encoded in terms of the following variables.

Pebble state variables $p_{v,i}$ for $v \in V$ and $0 \le i \le K$ are Boolean variables true if the node v is pebbled at time i.

Activation variables $a_{v,i}$ for $v \in V$ and $1 \le i \le K$ are Boolean variables that model a state change of a node v. If the variable $a_{v,i}$ is true, then node v will be pebbled or unpebbled at time i according to its state at time i−1.

Note that the SAT formula encodes K+1 pebble configurations with K steps describing the transition from one configuration to the other.

H. Clauses

The following set of clauses describes the reversible pebbling problem:

Initial clauses: At time 0 all the nodes are unpebbled:

$$\bigwedge_{v \in V} \overline{p}_{v,0}$$

Transition clauses: A node can be activated only if all the inputs are pebbled:

$$\bigwedge_{i=1}^{K} \bigwedge_{v \in V} \left( a_{v,i} \to \bigwedge_{w \in C(v)} p_{w,i-1} \right)$$

Note that if a node v has no children, the consequent in the implication is true, meaning that v may be activated at any time (except if a parent node is activated as described by the next set of clauses).

Activation exclusion clauses: If a node v is activated, then none of its children can be activated:

$$\bigwedge_{i=1}^{K} \bigwedge_{v \in V} \left( a_{v,i} \to \bigwedge_{w \in C(v)} \overline{a}_{w,i} \right)$$

Update clauses: Update the pebble state of a node v at step i according to $a_{v,i}$:

$$\bigwedge_{i=1}^{K} \bigwedge_{v \in V} (p_{v,i} = p_{v,i-1} \oplus a_{v,i})$$

Cardinality clauses: At each step, at most P pebbles are used:

$$\bigwedge_{i=0}^{K} \left( \sum_{v \in V} p_{v,i} \le P \right)$$

Final clauses: At the end of the computation all the outputs are pebbled and all the intermediate results unpebbled:

$$\bigwedge_{v \in O} p_{v,K} \wedge \bigwedge_{v \notin O} \overline{p}_{v,K}$$

I. Applications and Results

In this section, the universality of embodiments of the disclosed approach are illustrated by show-casing several examples in which large computations are expressed in terms of a sequence of smaller ones. In order to optimally use available qubit resources to store the intermediate results, a high-quality quantum memory management approach that accounts for embodiments of the disclosed SAT-based reversible pebble game solver is desirable. In certain example implementations, the open source SAT solver Z3. (See, e.g., Leonardo de Moura and Nikolaj Bjørner. "Z3: An efficient SMT solver," in Proceedings of the Tools and Algorithms for the Construction and Analysis of Systems, 14th International Conference, volume 4963, pp. 337-340 (Spring, 2008).

Figure 5:
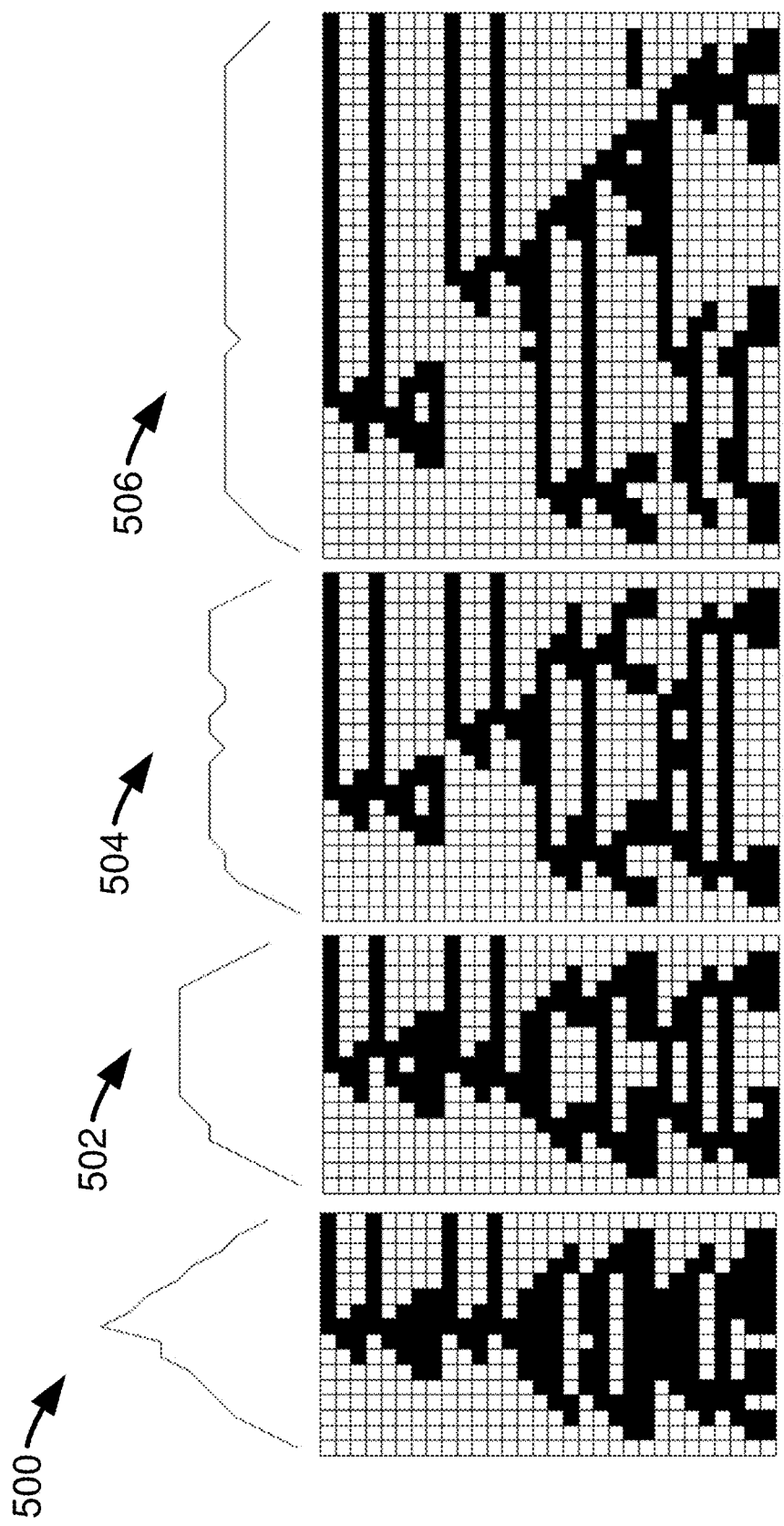
FIG. 5 includes several block diagrams that visualize the pebbling strategies obtained with 24, 16, 12, and 10 pebbles.

1) Show-case: Straight-line programs:

Embodiments of the disclosed technology are applied to the synthesis of straight-line programs used in cryptographic applications. Those programs are combinations of modular arithmetic operations as addition, subtraction, multiplication, and squaring. It is assumed that for each operation a quantum implementation exists, and a given cost in terms of quantum gates and ancillae will be discovered. One can estimate the cost of an algorithm implementation in terms of number of different operations, according to the resources available. Here, a straight-line program is selected that implements the addition between two points of an Edward curve in projective coordinates from J. W. Bos, C. Costello, H. Hisil, and K. Lauter, "Fast cryptography in genus 2," in Advances in Cryptology - EUROCRYPT 2013, T. Johansson and P. Q. Nguyen, Eds. Berlin, Heidelberg: Springer Berlin Heidelberg, 2013, pp. 194-210. Here, the resulting DAG is pebbled using a different number of pebbles. FIG. 5 includes several block diagrams 500, 502, 504, 506, that visualize the pebbling strategies obtained with 24, 16, 12, and 10 pebbles. In each case, a different number of operations was obtained, as reported in FIG. 5. For example, the first implementation (shown at 500) performs a total of 74 operations: 28 additions, 20 subtractions, 15 squaring and 11 multiplications. One can see how the tool manages to fit the desired computation into limited number of qubits, by increasing the number of required steps. As a consequence, the last implementation (shown at 506) has a higher cost in terms of operations: 110 in total. The overall cost of the algorithm on different hardware can be evaluated having some estimates of the real cost of each operation. On the top of each grid, the dynamic change is shown in the memory employed during the computation. A flat dynamic suggests that a constant number of qubits is used through the whole computation. A solution with a lower peak requires less qubits.

TABLE 1

COMPARISON

| | | | | Bennett | | Pebbling strategy | | | | |
|---|---|---|---|---|---|---|---|---|---|---|
| | pi | po | nodes | P | K | P | K | runtime | % P | xK |
| b2_m3 | 8 | 8 | 74 | 66 | 124 | 30 | 186 | 0.17 | 54.55 | 1.5 |
| b3_m4 | 12 | 12 | 59 | 47 | 82 | 20 | 117 | 121.37 | 57.45 | 1.43 |
| b4_m5 | 16 | 16 | 203 | 187 | 358 | 83 | 778 | 55.75 | 55.61 | 2.17 |
| b5_m7 | 20 | 20 | 256 | 236 | 452 | 106 | 888 | 31.15 | 55.08 | 1.96 |
| b6_m7 | 24 | 24 | 310 | 286 | 548 | 130 | 1132 | 35.72 | 54.55 | 2.07 |
| b8_m7 | 32 | 32 | 422 | 390 | 748 | 187 | 1884 | 11.59 | 52.05 | 2.52 |
| b10_m7 | 40 | 40 | 535 | 495 | 950 | 264 | 2938 | 28.66 | 46.67 | 3.09 |
| b12_m7 | 48 | 48 | 646 | 598 | 1148 | 331 | 4228 | 56.33 | 44.65 | 3.68 |
| b16_m23 | 64 | 64 | 881 | 817 | 1570 | 480 | 6218 | 133.45 | 41.25 | 3.96 |
| c17 | 5 | 2 | 12 | 7 | 12 | 4 | 12 | 0.01 | 42.86 | 1 |
| c432 | 36 | 7 | 208 | 172 | 337 | 60 | 685 | 23.70 | 65.12 | 2.03 |
| c499 | 41 | 32 | 219 | 178 | 324 | 77 | 610 | 60.08 | 56.74 | 1.88 |
| c880 | 60 | 26 | 334 | 274 | 522 | 82 | 1280 | 43.52 | 70.07 | 2.45 |
| c1355 | 41 | 32 | 219 | 178 | 324 | 77 | 594 | 2.63 | 56.74 | 1.83 |
| c1908 | 33 | 25 | 220 | 187 | 349 | 70 | 875 | 57.97 | 62.57 | 2.51 |
| c2670 | 157 | 63 | 554 | 397 | 731 | 160 | 1948 | 47.95 | 59.7 | 2.66 |
| c3540 | 50 | 22 | 856 | 806 | 1590 | 416 | 5434 | 111.2 | 48.39 | 3.42 |
| c5315 | 178 | 123 | 1257 | 1079 | 2035 | 498 | 7635 | 118.38 | 53.85 | 3.75 |
| c6288 | 32 | 32 | 1011 | 979 | 1926 | 640 | 10232 | 101.31 | 34.63 | 5.31 |
| c7522 | 207 | 108 | 1151 | 944 | 1780 | 540 | 7757 | 124.1 | 42.8 | 4.36 |

Average multiplicative factor for the number of steps = 2.68
Average percentage reduction of pebbles = 52.77

The above paragraph has been amended to include Table 1 as referenced. Table 1 was included in U.S. Provisional Application No. 62/782,256, which was incorporated in the subject Application by reference in its entirety. As such, no new material has been added.

In more detail, FIG. 5 shows examples of how the tool can be used to map a computation into a given number of ancillae: respectively 24 (Add:28. Sub:20, Sqrt:15. Mult: 11), 16 (Add:28, Sub:24, Sqrt:17, Mult:13), 12 (Add:24, Sub:34, Sqrt:19. Mult:13) and 10 (Add:34, Sub:38. Sqrt:25, Mult:13)

2) Show-Case: Comparison with Bennett Strategy:

The second show-case has the purpose of quantifying the ability of the program to map a design in a limited number of qubits. In order to do so, an operator was considered called H (different from the Hadamard gate) that is used internally to the algorithm that computes the doubling of two points referred before J. W. Bos, C. Costello, H. Hisil. and K. Lauter, "Fast cryptography in genus 2:" in Advances in Cryptology—EUROCRYPT 2013, T. Johansson and P. Q. Nguyen. Eds. Berlin, Heidelberg: Springer Berlin Heidelberg, 2013, pp. 194-210.

This operator is a composition of modular additions (+) and modular subtraction (−):

inputs: a, b, c, d
outputs: x, y, z, t
$t_1=a+b\ t_2=c+d\ t_3=a-b\ t_4=c-d$
$x=t_1+t_2\ y=t_1-t_2\ z=t_3+t_4\ t=t_3-t_4$ Experiments reported in Table 1 show a comparison between the Bennett pebbling method and embodiments of the disclosed technology. The different designs correspond to the H operator with different bitwidths and modulus. Also shown are results for the well known ISCAS benchmark. The graph representation for the function has been extracted from an XOR-majority graph using the open source tool mockturtle. Mathias Soeken et al., "The (EPFL) Logic Synthesis Libraries:" arXiv preprint at arXiv:1805.05121 (2018). A method to use XOR-majority graphs into quantum circuits using a naive quantum memory management strategy was presented in Mathias Soeken et al., "Design Automation and Design Space Exploration for Quantum Computers," arXiv preprint arXiv: 1612.00631 (2017). The number of pebbles corresponds to the minimum one for which the solver could find a solution within 2 minutes. Even with this restricted timeout the algorithm finds a solution for a significantly reduced number of pebbles. The average percentage reduction is 52.77%. As the pebbles are reduced, the number of steps increase with respect to the Bennett method. In average the number of steps for the constrained design is 2.68×the one of the naive strategy. With the increase of the size of the DAG, we see a fewer pebble reduction. The reason is in the timeout chosen, as the solver takes more time for large designs: the number of variables of the SAT problem is proportional to $n^2$ where n is the number of nodes of the DAG. Also increasing the number of nodes, more steps seems to be required. This is also dependent on the timeout. In fact the algorithm is capable of finding many solutions with different number of pebbles but same number of steps. Nevertheless more constrained solutions require more time to be resolved.

3) Show-Case: Adapting to Hardware Constraints:

In the last example, programming a quantum system composed of 16 qubits was considered, as for example the ibmqx5 quantum computer from IBM. In this example, the goal was to map an oracle for the 9-inputs AND function as part of a more complex algorithm, e.g., Grover's algorithm.

Figure 6:
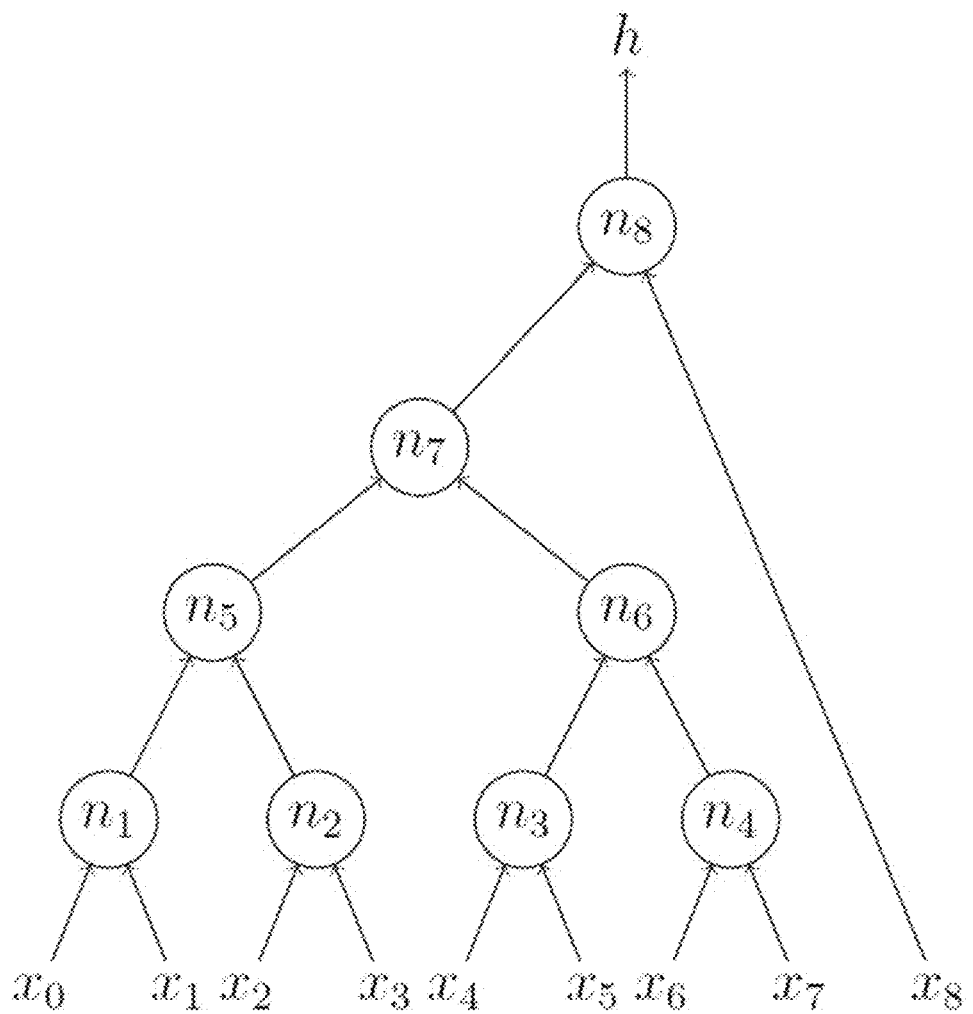
FIG. 6 is a schematic block diagram of a DAG of a computation that involves 9-inputs and several intermediate computations.

The function can be represented using the DAG in FIG. 6. FIG. 6 is a schematic block diagram 600 of a DAG of a 9-inputs AND.

Figure 7:
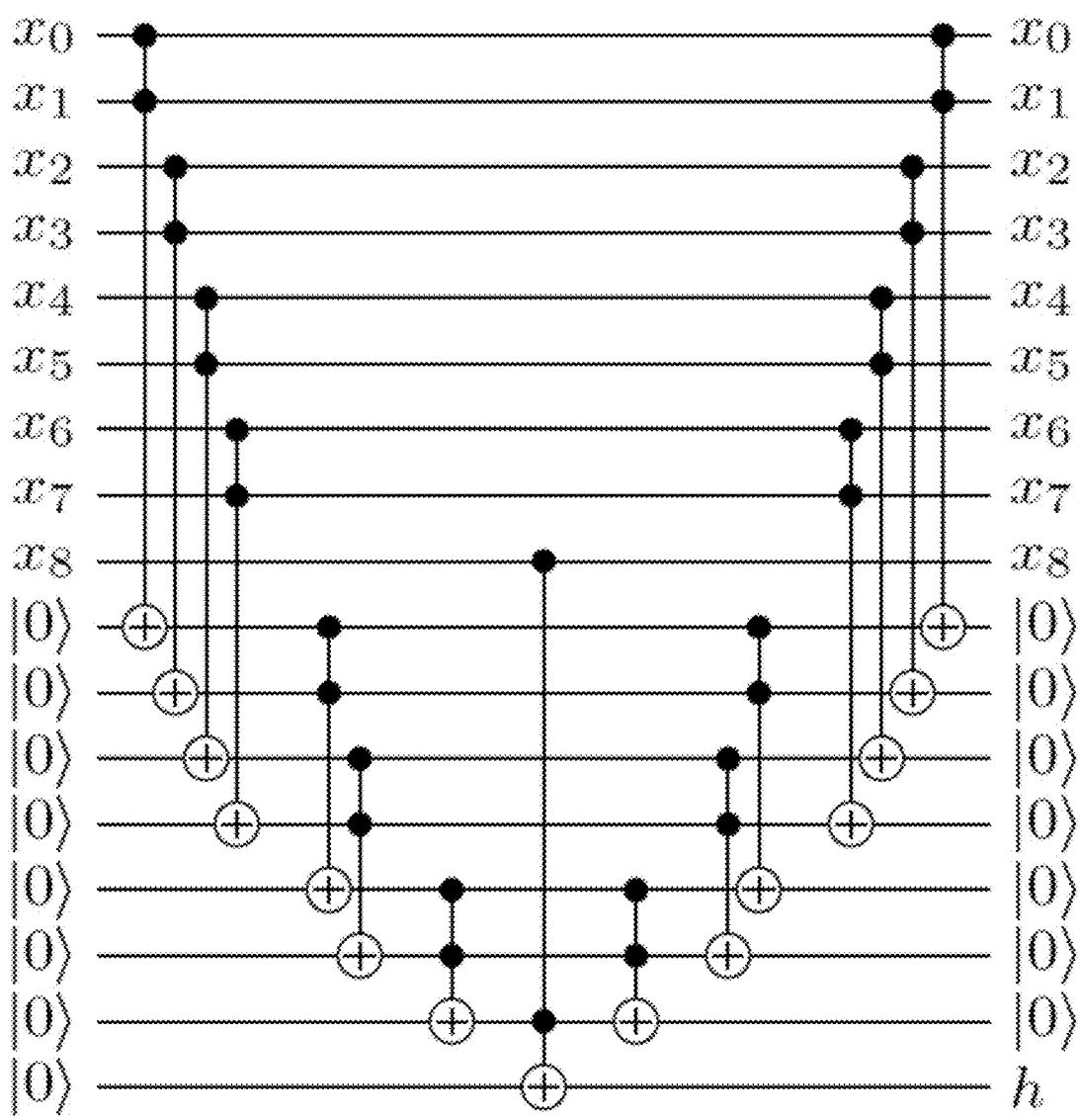
FIG. 7 is a schematic block diagram illustrating a Bennett strategy for the DAG from FIG. 6.

A first attempt was to use the Bennett strategy for qubits clean-up. This method leads to the circuit shown in FIG. 7. In more detail, FIG. 7 is a schematic block diagram 700 illustrating a Bennett strategy.

Figure 9:
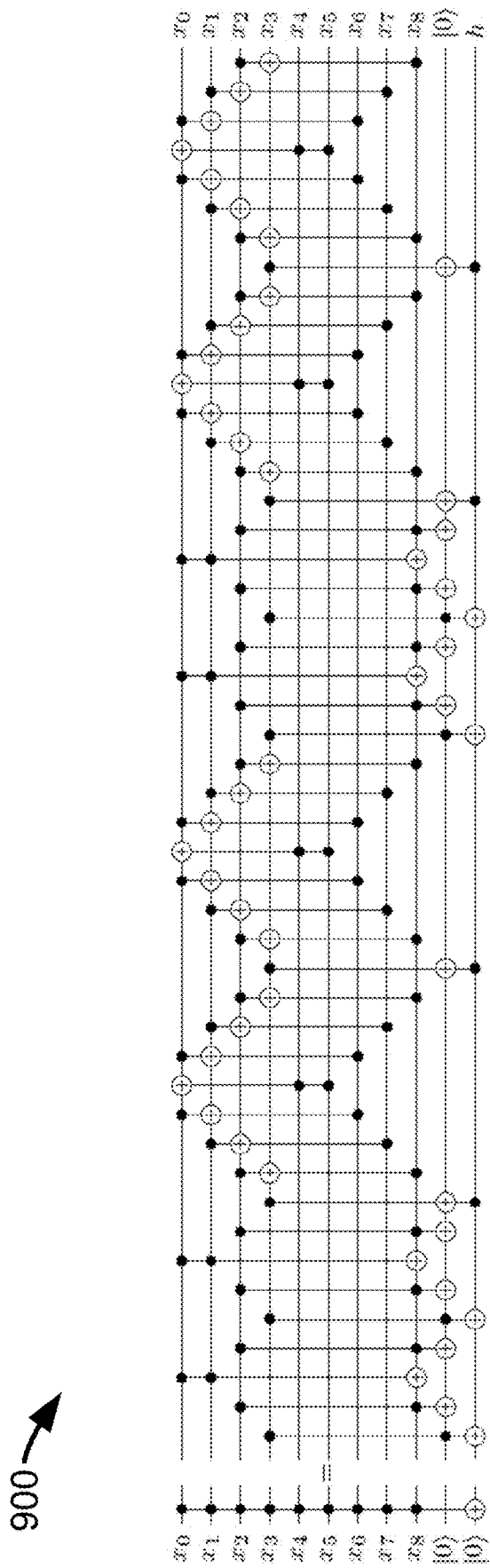
FIG. 9 is a schematic block diagram illustrating a Pebbling strategy for the DAG from FIG. 6, combined with a Barenco based decomposition.

A second possibility is to apply the well known decomposition method proposed by Barenco in Adriano Barenco et al., "Elementary gates for quantum computation," arXiv preprint at arXiv:quant-ph/9503016 (1995) to the 9-controls Toffoli gates, as in FIG. 9. In more detail, FIG. 9 is a schematic block diagram 900 illustrating a Barenco decomposition.

In this case, only one extra ancilla is required (11 qubits in total). The drawback of this solution is that there is an explosion in the number of gates: from 15 to 48. It is known how, increasing the number of gates can negatively affect the noise in the final result.

Figure 8:
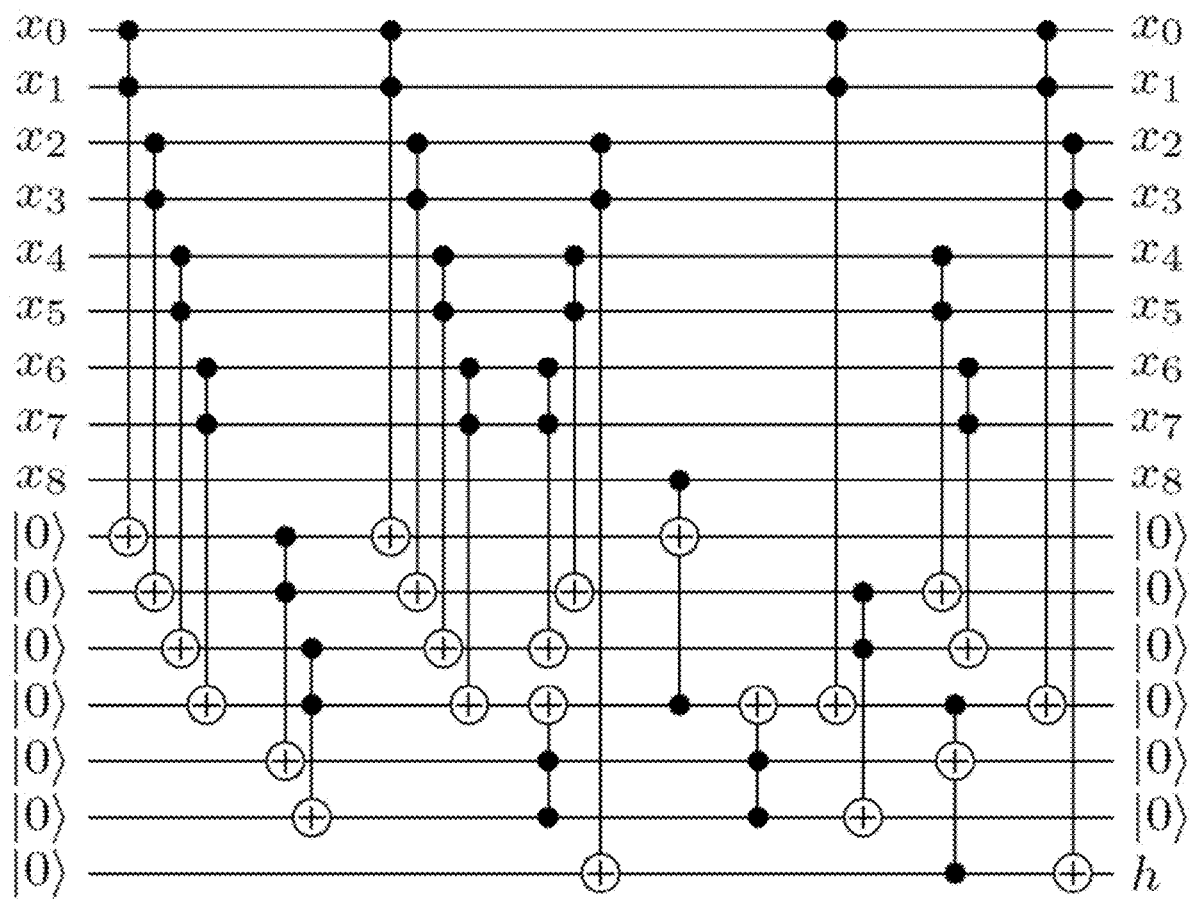
FIG. 8 is a schematic block diagram illustrating a Pebbling strategy for the DAG from FIG. 6.

Embodiments of the disclosed technology provide enough flexibility to find a more balanced solution. Setting the number of pebbles to exactly 16, one can indeed obtain a valid pebbling strategy that maps the desired functionality into the available number of qubits. The result is a circuit with only 23 gates, as shown for example in FIG. 8. In more detail, FIG. 8 is a schematic block diagram 800 illustrating a Pebbling strategy.

J. Remarks

As discussed, embodiments of quantum memory management systems are disclosed herein. Certain implementations concern quantum memory management system for quantum computing where all intermediate results coming out from smaller parts of a computation need to be uncomputed. Particular embodiments describe a SAT-based algorithm to find solutions for quantum memory management. Also shown herein is how the clean-up problem corresponds to the reversible pebbling game problem. Consequently, embodiments of the disclosed technology solve instances of the reversible pebbling game to explore the trade-off between memory and number of operations. Finding an efficient pebbling strategy is desirable in quantum algorithm development, where often small manually optimized circuits are cascaded together to perform more complex computations. In particular, embodiments of the disclosed technology can enable computations in a constrained system, when this would not otherwise be possible. In general, the disclosed technology can be used in cryptographic applications to synthesize straight-line programs, but also in any hierarchical synthesis automatic method. It can also be used to estimate the cost of performing an algorithm on a given hardware in terms of number of operations. Experiments show that the disclosed technology is capable of finding solutions with an average reduction in number of ancillae required of 52.77% with a timeout of 2 minutes. Also shown are examples of how embodiments of the tools can be used by a designer to map a required computation into the available hardware.

IV. Example Computing Environments

Figure 10:
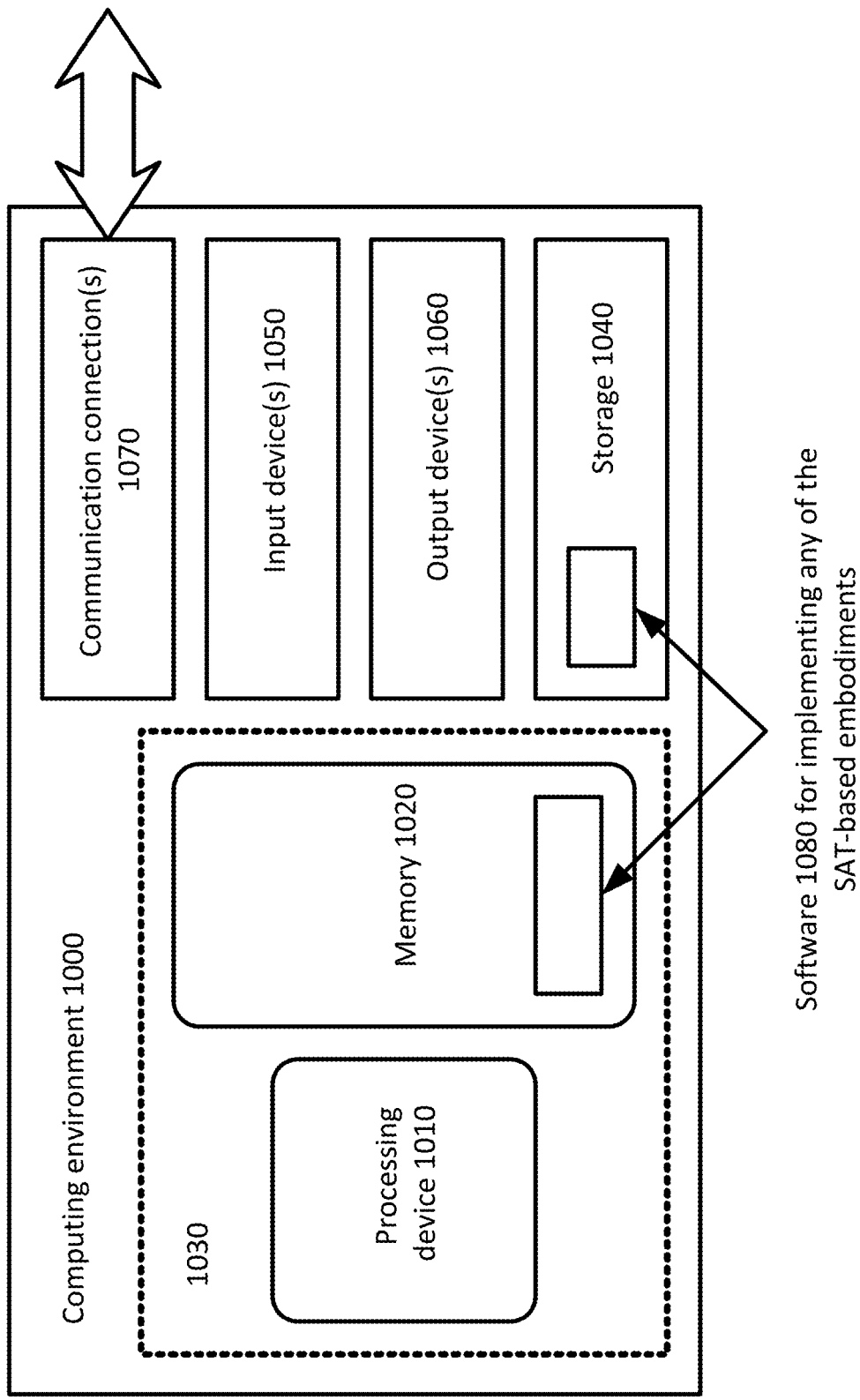
FIG. 10 illustrates a generalized example of a suitable classical computing environment in which several of the described embodiments can be implemented.

FIG. 10 illustrates a generalized example of a suitable classical computing environment 1000 in which several of the described embodiments can be implemented. The computing environment 1000 is not intended to suggest any limitation as to the scope of use or functionality of the disclosed technology, as the techniques and tools described herein can be implemented in diverse general-purpose or special-purpose environments that have computing hardware.

With reference to FIG. 10, the computing environment 1000 includes at least one processing device 1010 and memory 1020. In FIG. 10, this most basic configuration 1030 is included within a dashed line. The processing device 1010 (e.g., a CPU or microprocessor) executes computer-executable instructions. In a multi-processing system, multiple processing devices execute computer-executable instructions to increase processing power. The memory 1020 may be volatile memory (e.g., registers, cache, RAM. DRAM, SRAM), non-volatile memory (e.g., ROM, EEPROM, flash memory), or some combination of the two. The memory 1020 stores software 1080 for synthesizing/generating/controlling/implementing any of the disclosed SAT-based embodiments as described herein. The memory 1020 can also store software 1080 for synthesizing/generating/controlling/implementing any of the techniques as described herein.

The computing environment can have additional features. For example, the computing environment 1000 includes storage 1040, one or more input devices 1050, one or more output devices 1060, and one or more communication connections 1070. An interconnection mechanism (not shown), such as a bus, controller, or network, interconnects the components of the computing environment 1000. Typically, operating system software (not shown) provides an operating environment for other software executing in the computing environment 1000, and coordinates activities of the components of the computing environment 1000.

The storage 1040 can be removable or non-removable, and includes one or more magnetic disks (e.g., hard drives), solid state drives (e.g., flash drives), magnetic tapes or cassettes. CD-ROMs, DVDs. or any other tangible non-volatile storage medium which can be used to store information and which can be accessed within the computing environment 1000. The storage 1040 can also store instructions for the software 1080 for synthesizing/generating/controlling/implementing any of the disclosed SAT-based embodiments.

The input device(s) 1050 can be a touch input device such as a keyboard, touchscreen, mouse, pen, trackball, a voice input device, a scanning device, or another device that provides input to the computing environment 1000. The output device(s) 1060 can be a display device (e.g., a computer monitor, laptop display, smartphone display, tablet display, netbook display, or touchscreen), printer, speaker, or another device that provides output from the computing environment 1000.

The communication connection(s) 1070 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical. RE, infrared, acoustic, or other carrier.

As noted, the various methods, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 1020 and/or storage 1040, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 11:
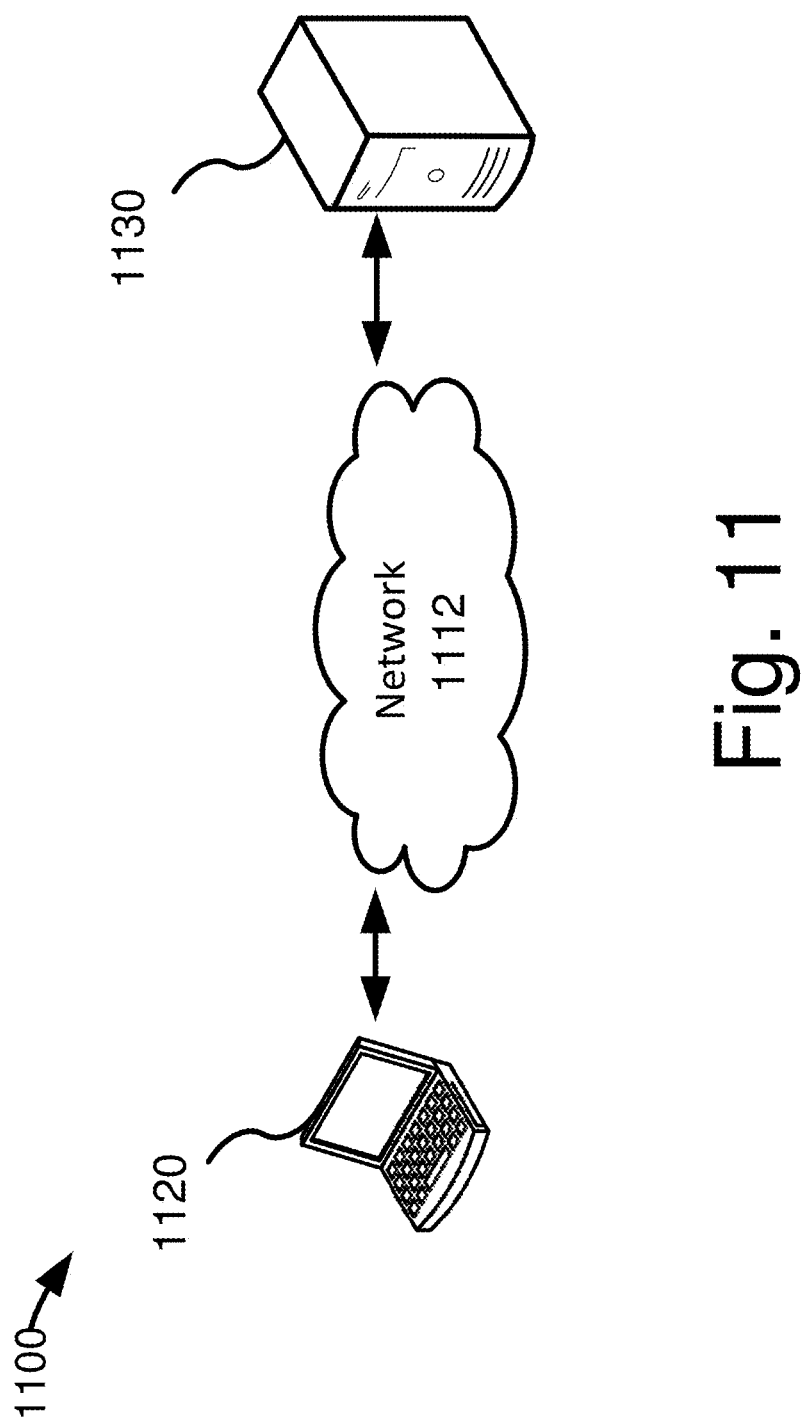
FIG. 11 is an example of a possible network topology (e.g., a client-server network) for implementing a system according to the disclosed technology.

An example of a possible network topology 1100 (e.g., a client-server network) for implementing a system according to the disclosed technology is depicted in FIG. 11. Networked computing device 1120 can be, for example, a computer running a browser or other software connected to a network 1112. The computing device 1120 can have a computer architecture as shown in FIG. 10 and discussed above. The computing device 1120 is not limited to a traditional personal computer but can comprise other computing hardware configured to connect to and communicate with a network 1112 (e.g., smart phones, laptop computers, tablet computers, or other mobile computing devices, servers, network devices, dedicated devices, and the like). Further, the computing device 1120 can comprise an FPGA or other programmable logic device. In the illustrated embodiment, the computing device 1120 is configured to communicate with a computing device 1130 (e.g., a remote server, such as a server in a cloud computing environment) via a network 1112. In the illustrated embodiment, the computing device 1120 is configured to transmit input data to the computing device 1130, and the computing device 1130 is configured to implement a technique according to any of the disclosed embodiments and/or a circuit generation or compilation/synthesis methods for generating quantum circuits based on or in conjunction with any of the techniques disclosed herein. The computing device 1130 can output results to the computing device 1120. Any of the data received from the computing device 1130 can be stored or displayed on the computing device 1120 (e.g., displayed as data on a graphical user interface or web page at the computing devices 1120). In the illustrated embodiment, the illustrated network 1112 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 1112 can be the Internet or a similar public network and operate using an appropriate protocol (e.g., the HTTP protocol).

Figure 12:
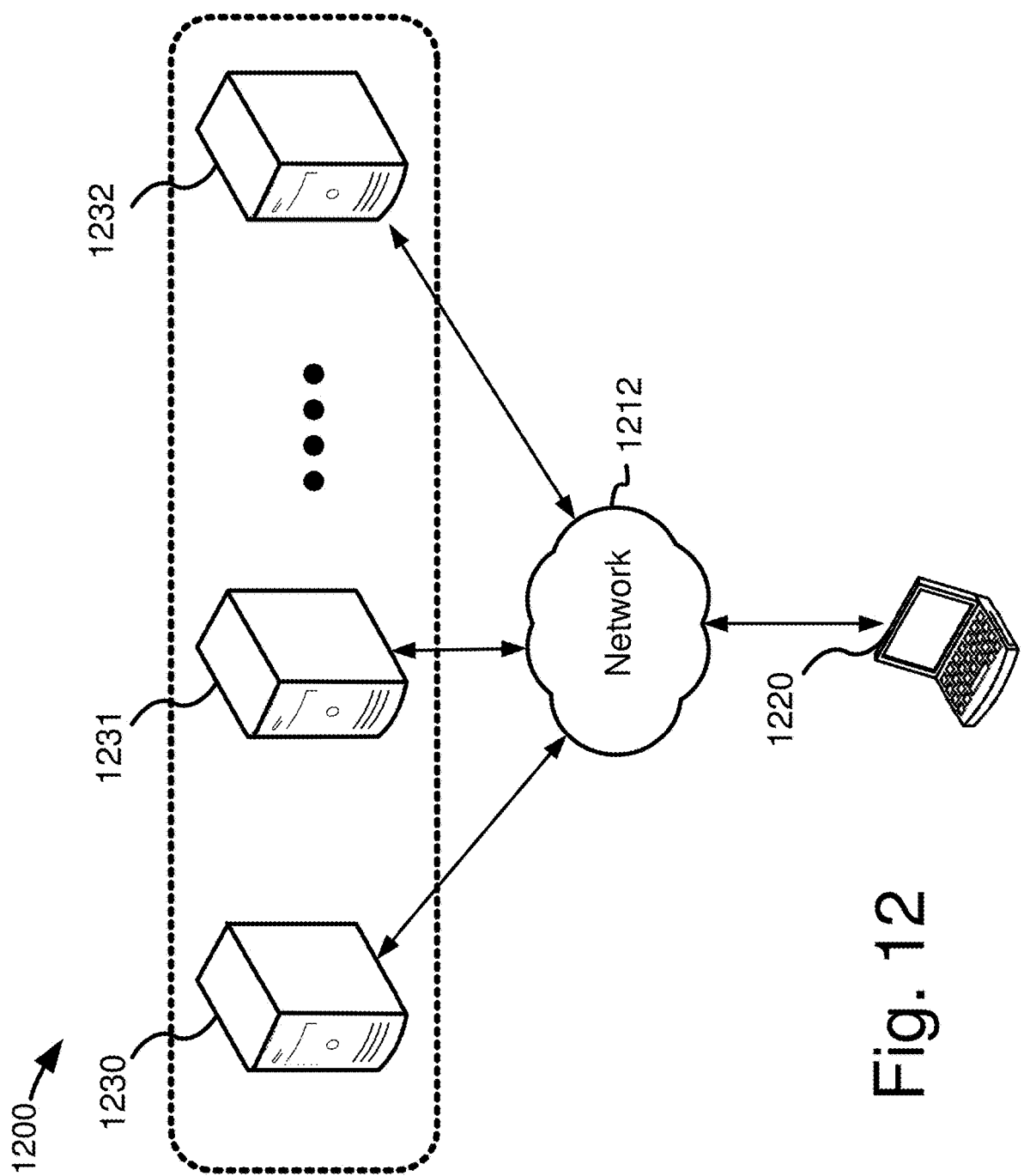
FIG. 12 is another example of a possible network topology (e.g., a distributed computing environment) for implementing a system according to the disclosed technology.

Another example of a possible network topology 1200 (e.g., a distributed computing environment) for implementing a system according to the disclosed technology is depicted in FIG. 12. Networked computing device 1220 can be, for example, a computer running a browser or other software connected to a network 1212. The computing device 1220 can have a computer architecture as shown in FIG. 10 and discussed above. In the illustrated embodiment, the computing device 1220 is configured to communicate with multiple computing devices 1230, 1231, 1232 (e.g., remote servers or other distributed computing devices, such as one or more servers in a cloud computing environment) via the network 1212. In the illustrated embodiment, each of the computing devices 1230, 1231, 1232 in the computing environment 1200 is used to implement a technique according to any of the disclosed embodiments and/or a circuit generation or compilation/synthesis methods for generating quantum circuits based on or in conjunction with any of the techniques disclosed herein. In other words, the computing devices 1230, 1231, 1232 form a distributed computing environment in which the disclosed processes and/or generation/compilation/synthesis processes are shared across multiple computing devices. The computing device 1220 is configured to transmit input data to the computing devices 1230, 1231, 1232, which are configured to distributively implement such as process, including performance of any of the disclosed methods or creation of any of the disclosed circuits, and to provide results to the computing device 1220. Any of the data received from the computing devices 1230, 1231, 1232 can be stored or displayed on the computing device 1220 (e.g., displayed as data on a graphical user interface or web page at the computing devices 1220). The illustrated network 1212 can be any of the networks discussed above with respect to FIG. 11.

Figure 13:
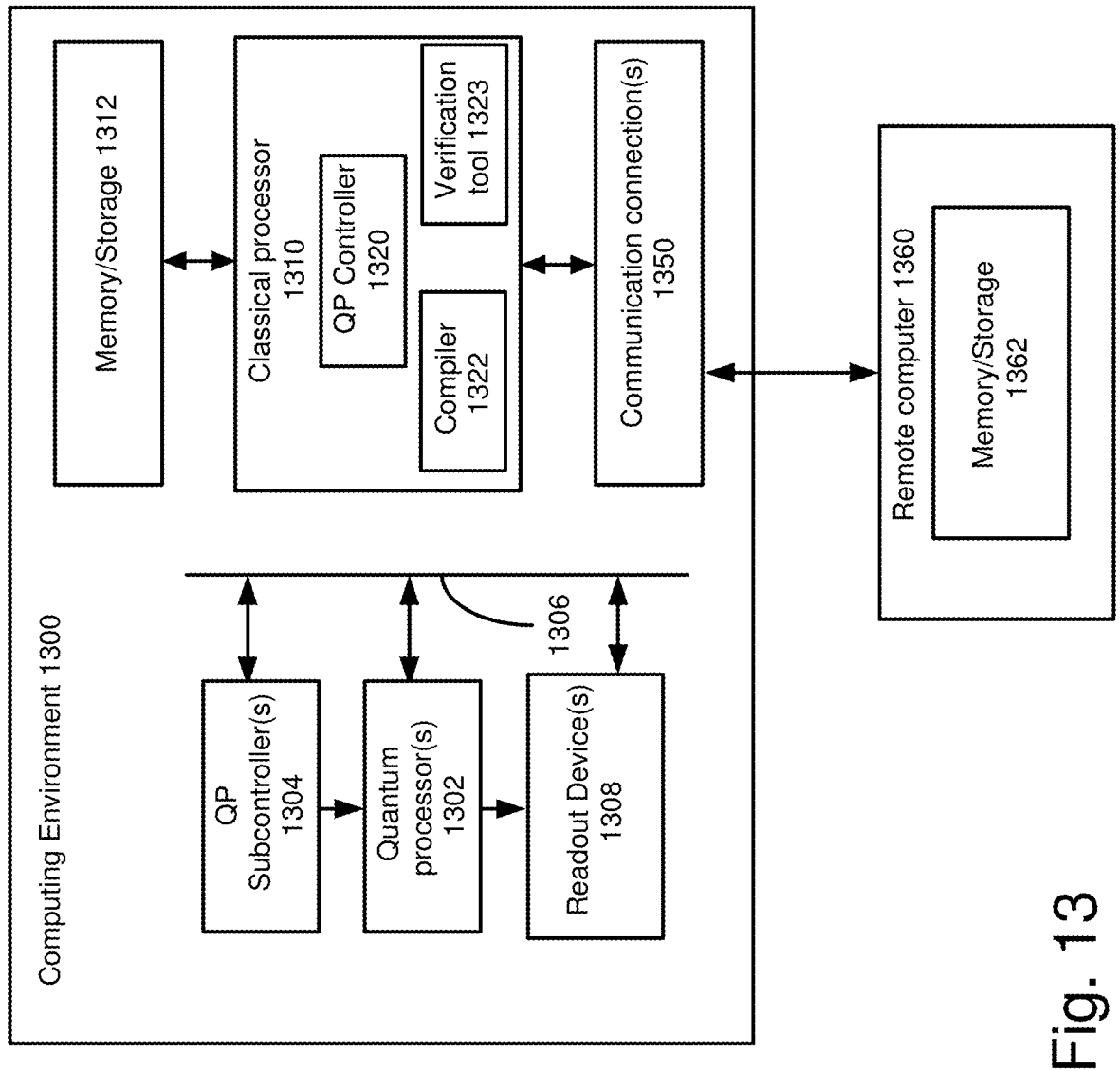
FIG. 13 illustrates an exemplary system for implementing the disclosed technology includes computing environment.

With reference to FIG. 13, an exemplary system for implementing the disclosed technology includes computing environment 1300. In computing environment 1300, a compiled quantum computer circuit description (including quantum circuits for performing any of the techniques as disclosed herein) can be used to program (or configure) one or more quantum processing units such that the quantum processing unit(s) implement the circuit described by the quantum computer circuit description.

The environment 1300 includes one or more quantum processing units 1302 and one or more readout device(s) 1308. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer. (c) a fault-tolerant architecture for quantum computing: and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 1306 at the control of quantum processor controller 1320. The quantum processor controller (QP controller) 1320 can operate in conjunction with a classical processor 1310 (e.g., having an architecture as described above with respect to FIG. 10) to implement the desired quantum computing process. In the illustrated example, the QP controller 1320 further implements the desired quantum computing process via one or more QP subcontrollers 1304 that are specially adapted to control a corresponding one of the quantum processor(s) 1302. For instance, in one example, the quantum controller 1320 facilitates implementation of the compiled quantum circuit by sending instructions to one or more memories (e.g., lower-temperature memories), which then pass the instructions to low-temperature control unit(s) (e.g., QP subcontroller(s) 1304) that transmit for instance, pulse sequences representing the gates to the quantum processing unit(s) 1302 for implementation. In other examples, the QP controller(s) 1320 and QP subcontroller(s) 1304 operate to provide appropriate magnetic fields, encoded operations, or other such control signals to the quantum processor(s) to implement the operations of the compiled quantum computer circuit description. The quantum controller(s) can further interact with readout devices 1308 to help control and implement the desired quantum computing process (e.g., by reading or measuring out data results from the quantum processing units once available, etc.)

With reference to FIG. 13, compilation is the process of translating a high-level description of a quantum algorithm into a quantum computer circuit description comprising a sequence of quantum operations or gates, which can include the circuits as disclosed herein. The compilation can be performed by a compiler 1322 using a classical processor 1310 (e.g., as shown in FIG. 10) of the environment 1300 which loads the high-level description from memory or storage devices 1312 and stores the resulting quantum computer circuit description in the memory or storage devices 1312.

In other embodiments, compilation and/or verification can be performed remotely by a remote computer 1360 (e.g., a computer having a computing environment as described above with respect to FIG. 10) which stores the resulting quantum computer circuit description in one or more memory or storage devices 1362 and transmits the quantum computer circuit description to the computing environment 1300 for implementation in the quantum processing unit(s) 1302. Still further, the remote computer 1300 can store the high-level description in the memory or storage devices 1362 and transmit the high-level description to the computing environment 1300 for compilation and use with the quantum processor(s). In any of these scenarios, results from the computation performed by the quantum processor(s) can be communicated to the remote computer after and/or during the computation process. Still further, the remote computer can communicate with the QP controller(s) 1320 such that the quantum computing process (including any compilation, verification, and QP control procedures) can be remotely controlled by the remote computer 1360. In general, the remote computer 1360 communicates with the QP controller(s) 1320, compiler/synthesizer 1322, and/or verification tool 1323 via communication connections 1350.

In particular embodiments, the environment 1300 can be a cloud computing environment, which provides the quantum processing resources of the environment 1300 to one or more remote computers (such as remote computer 1360) over a suitable network (which can include the internet).

V. Further Example Embodiments

Figure 15:
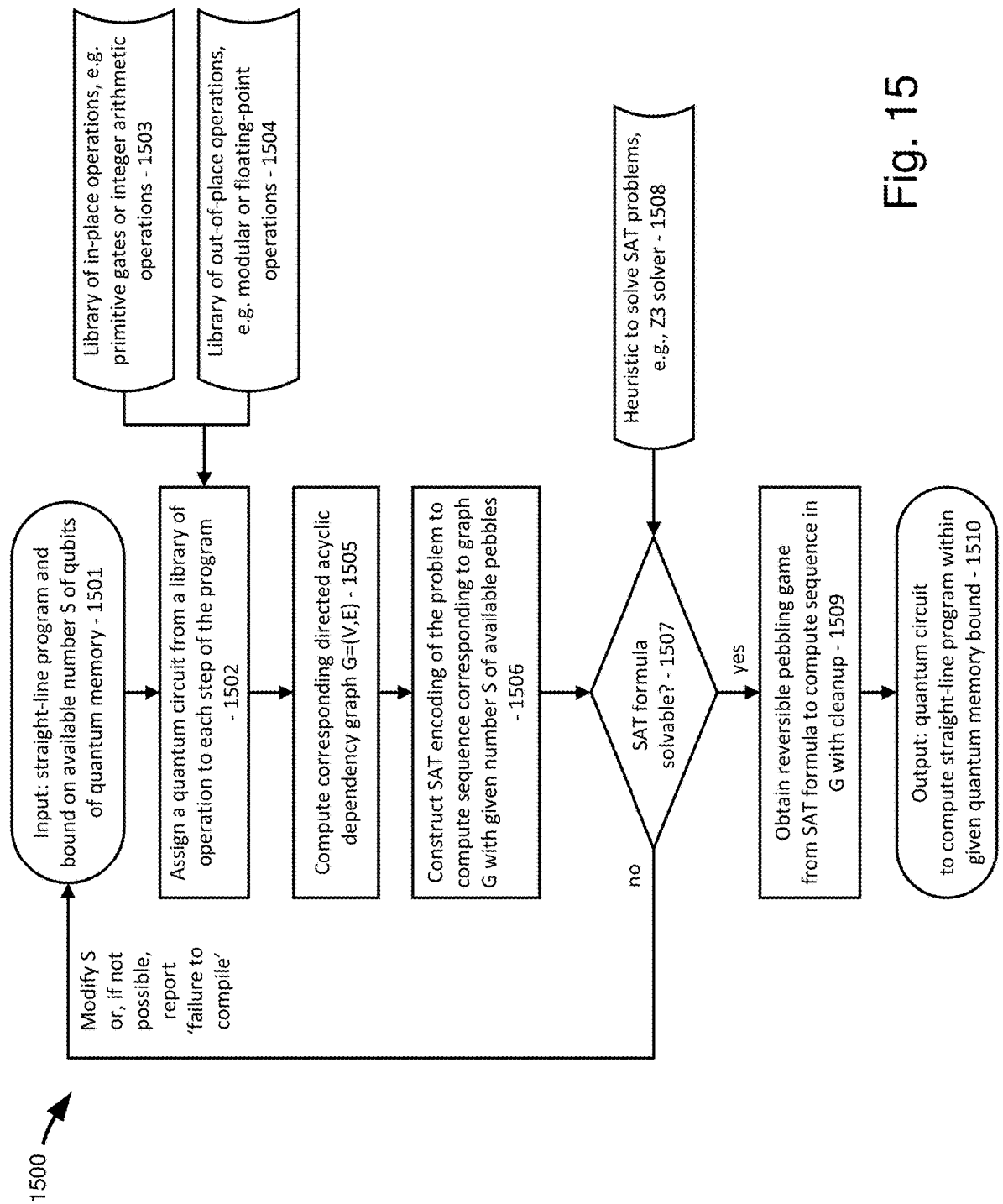
FIG. 15 is a flow chart illustrating a method to manage quantum memory based on solving reversible pebbling games.

FIG. 15 is a flow chart 1500 illustrating a method to manage quantum memory based on reversible pebbling games constructed from SAT-encodings. More specifically, FIG. 15 is an end-to-end flow for an example method to compile of an input straight-line program 1501 together with a bound on the available number of qubit of quantum memory into an output quantum circuit 1510. The particular operations and sequence of operations should not be construed as limiting, as they can be performed alone or in any combination, subcombination, and/or sequence with one another. Additionally, the illustrated operations can be performed together with one or more other operations.

The example method starts by assigning a quantum circuit to each step of the program 1502. These operations that the given program is decomposed into are typically found in a library, including, but not limited to, libraries of inplace quantum operations 1503 and libraries of out-of-place operations 1504. Next, an internal representation of the program is constructed which typically is a directed acyclic dependency graph 1505. Next, at 1506, an encoding of the computation as an instance of a satisfiability problem (SAT) is constructed. The nodes of the dependency graph correspond to computations which potentially have to allocated quantum memory. The clauses of the SAT encoding express the requirement to allocated the memory, to deallocate it, and to maintain the order of the dependencies. Then, a SAT solver is used to solve the SAT problem 1508 and it is determined 1507 whether the problem is solvable or not. If it is not solvable, the compilation fails, and either the overall compilation has to be aborted or else the memory bound has to be changed and more memory has to be made available. If the SAT solver succeeds, we obtain a reversible pebble game as a solution 1509 which encodes all computations and uncomputations that are needed to realize the input program 1501 as a quantum circuit that cleans up all intermediate results. Finally, 1510, the resulting quantum circuit is returned.

Figure 16:
FIG. 16 is a flow chart illustrating another method for managing quantum memory.

FIG. 16 is a flow chart 1600 illustrating a method for managing quantum memory. The particular operations and sequence of operations should not be construed as limiting, as they can be performed alone or in any combination, subcombination, and/or sequence with one another. Additionally, the illustrated operations can be performed together with one or more other operations.

A straight-line program is implemented via a sequence of quantum operations while guaranteeing a given total bound on available quantum memory (as shown at 1610).

In certain embodiments, the straight-line program is expressed over a set of library operations. For instance, the library operations can comprise in-place operations and out-of-place operations.

In some embodiments, the method further comprises computing a dependency graph structure for the straight-line program. The dependency graph structure, together with the given total bound on available memory, can be used to encode an instance of a satisfiability (SAT) problem. Still further, in certain embodiments, the method further comprises using a SAT solver to attempt to solve the SAT problem. The SAT problem can be a solvable SAT problem, and the method can further comprise constructing a solution to the SAT problem where the solution corresponds to a reversible pebble game. In some embodiments, the method further comprises translating the reversible pebble game into a quantum circuit to compute the straight-line program.

In certain embodiments, the method further comprises trading off a number of qubits relative to a size or depth of a quantum circuit to implement a function in the quantum circuit. The trading off can be performed by constructing one or more pebble games on a dependency graph.

In particular embodiments, the method further comprises: constructing a SAT problem to determine the sequence of quantum operations; using a SAT solver to attempt to solve the SAT problem: receiving an indication that the SAT solver failed in an attempt; adjusting a number of available qubits; and repeating use of the SAT solver to attempt to solve the adjusted SAT problem.

In certain embodiments, the method further comprises: constructing a SAT problem to determine the sequence of quantum operations: using a SAT solver to attempt to solve the SAT problem: receiving an indication that the SAT solver failed in an attempt; executing a bounded-model checking solver to generate mathematical evidence that no solution to the pebble game with a given number of steps and a given number of pebbles can be constructed, or executing PDR (Property Directed Reachability) to generate mathematical evidence that no solution to the pebble game with a given number of pebbles can be constructed.

Figure 17:
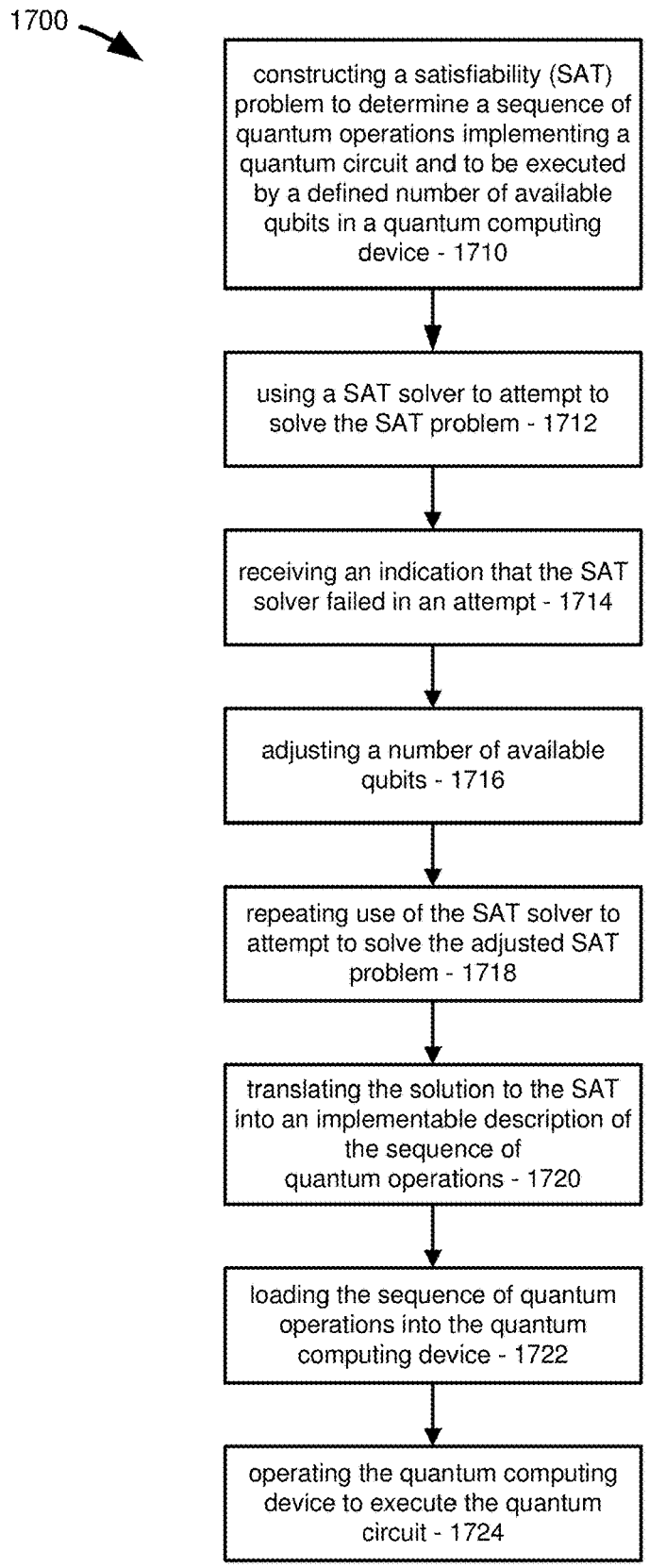
FIG. 17 is a flow chart illustrating a further method for managing quantum memory.

FIG. 17 is a flow chart 1700 illustrating a method for managing quantum memory. The particular operations and sequence of operations should not be construed as limiting, as they can be performed alone or in any combination, subcombination, and/or sequence with one another. Additionally, the illustrated operations can be performed together with one or more other operations.

A satisfiability (SAT) problem is constructed to determine a sequence of quantum operations implementing a quantum circuit and to be executed by a defined number of available qubits in a quantum computing device (as shown at 1710). A SAT solver is used to attempt to solve the SAT problem (as shown at 1712).

In some embodiments, the method further comprises receiving an indication that the SAT solver failed in an attempt (as shown at 1714): adjusting a number of available qubits (as shown at 1716): and repeating use of the SAT solver to attempt to solve the adjusted SAT problem (as shown at 1718). In certain embodiments, a solution to the SAT problem corresponds to a reversible pebble game.

In particular embodiments, the method further comprises translating the solution to the SAT into an implementable description of the sequence of quantum operations (as shown at 1720). The method can further comprise loading the sequence of quantum operations into the quantum computing device (as shown at 1722); and operating the quantum computing device to execute the quantum circuit (as shown at 1724).

Any of the disclosed embodiments can be implemented by one or more computer-readable media storing computer-executable instructions, which when executed by a computer cause the computer to perform any of the disclosed methods.

Any of the disclosed embodiments can also be performed by systems for performing embodiments of the disclosed embodiments comprising a classical computer configured to program, control, and/or measure a quantum computing device in accordance with the disclosed technology.

VI. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method to manage quantum memory, comprising: implementing a straight-line program via a sequence of quantum operations while guaranteeing a given total bound on available quantum memory.

2. The method of claim 1, wherein each node of the program corresponds to a quantum circuit from a set of library operations.

3. The method of claim 2, wherein the library operations comprise in-place operations and out-of-place operations.

4. The method of claim 1, further comprising computing a dependency graph structure for the straight-line program.

5. The method of claim 4, where the dependency graph structure, together with the given total bound on available memory, is used to encode an instance of a satisfiability (SAT) problem.

6. The method of claim 5, further comprising using a SAT solver to attempt to solve the SAT problem.

7. The method of claim 6, wherein the SAT problem is a solvable SAT problem, and wherein the method further comprises constructing a solution to the SAT problem where the solution corresponds to a reversible pebble game.

8. The method of claim 7, further comprising translating the reversible pebble game into a quantum circuit to compute the straight-line program.

9. The method of claim 1, wherein the method further comprises trading off a number of qubits relative to a size or depth of a quantum circuit to implement a function in the quantum circuit.

10. The method of claim 9, wherein the trading off is performed by constructing one or more pebble games on a dependency graph.

11. The method of claim 1, wherein the method further comprises:
constructing a SAT problem to determine the sequence of quantum operations;
using a SAT solver to attempt to solve the SAT problem;
receiving an indication that the SAT solver failed in an attempt;
adjusting a number of available qubits; and
repeating use of the SAT solver to attempt to solve the adjusted SAT problem.

12. The method of claim 1, wherein the method further comprises:
constructing a SAT problem to determine the sequence of quantum operations;
using a SAT solver to attempt to solve the SAT problem;
receiving an indication that the SAT solver failed in an attempt;
executing a bounded-model checking solver to generate mathematical evidence that no solution to the pebble game with a given number of steps and a given number of pebbles can be constructed, or executing PDR (Property Directed Reachability) to generate mathematical evidence that no solution to the pebble game with a given number of pebbles can be constructed.

13. A method, comprising:
constructing a satisfiability (SAT) problem to determine a sequence of quantum operations implementing a quantum circuit and to be executed by a defined number of available qubits in a quantum computing device; and
using a SAT solver to attempt to solve the SAT problem.

14. The method of claim 13, further comprising:
receiving an indication that the SAT solver failed in an attempt;
adjusting a number of available qubits; and
repeating use of the SAT solver to attempt to solve the adjusted SAT problem.

15. The method of claim 13, wherein a solution to the SAT problem corresponds to a reversible pebble game.

16. The method of claim 13, further comprising translating the solution to the SAT into an implementable description of the sequence of quantum operations.

17. The method of claim 16, further comprising:
loading the sequence of elementary quantum gates into the quantum computing device; and
operating the quantum computing device to execute the quantum circuit.

18. A quantum computing device, comprising:
a compiled quantum computer circuit description including a plurality of quantum circuits, the compiled quantum computer circuit description configured to program one or more quantum processing units to execute a sequence of elementary quantum gates generated by:
implementing a straight-line program via a sequence of quantum operations while guaranteeing a given total bound on available quantum memory.

19. The quantum computing device of claim 18, wherein the compiled quantum computer circuit description is further configured to program one or more quantum processing units to execute a sequence of elementary quantum gates generated by:
constructing a SAT problem to determine the sequence of quantum operations;
using a SAT solver to attempt to solve the SAT problem;
receiving an indication that the SAT solver failed in an attempt;
adjusting a number of available qubits; and
repeating use of the SAT solver to attempt to solve the adjusted SAT problem.

20. The quantum computing device of claim 19, wherein the SAT problem is a solvable SAT problem, and wherein the compiled quantum computer circuit description is further configured to program one or more quantum processing units to execute a sequence of elementary quantum gates generated by:
constructing a solution to the SAT problem where the solution corresponds to a reversible pebble game.

\* \* \* \* \*